United States Patent [19]
Furukawa et al.

[11] Patent Number: 5,463,618
[45] Date of Patent: Oct. 31, 1995

[54] ECHO CANCELLER

[75] Inventors: Hiroki Furukawa; Junichi Tagawa, both of Osaka; Takeo Kanamori, Hirakata; Satoru Ibaraki, Higashiosaka, all of Japan

[73] Assignee: Matsushita Electric Industrial Co., Ltd., Osaka, Japan

[21] Appl. No.: 249,888

[22] Filed: May 26, 1994

[30] Foreign Application Priority Data

May 28, 1993 [JP] Japan .................. 5-126883

[51] Int. Cl.⁶ ........................................... H04B 3/23
[52] U.S. Cl. ........................................ 370/32.1; 379/410
[58] Field of Search .................. 370/32.1, 32; 375/8, 375/207, 208, 209, 210, 222, 221; 379/406, 410, 411, 408, 409, 407

[56] References Cited

U.S. PATENT DOCUMENTS

| | | | |
|---|---|---|---|
| 4,894,820 | 1/1990 | Miyamoto et al. | 370/32.1 |
| 4,918,727 | 4/1990 | Rohrs et al. | 379/410 |
| 5,018,134 | 5/1991 | Kakubo et al. | 370/32.1 |

FOREIGN PATENT DOCUMENTS 4-39248  6/1992  Japan .
4-227341  8/1992  Japan .

OTHER PUBLICATIONS

S. Minami et al., "A Double Talk Detection Method for an Echo Canceller", *IEEE 1985 International Communications Conference*, vol. 3, pp. 1492–1497.

H. Yasukawa, et al., "Acoustic Echo Canceller with High Speech Quality", *IEEE ICASSP'87*, pp. 2125–2128 (1987).

*Primary Examiner*—Douglas W. Olms
*Assistant Examiner*—Dang Ton
*Attorney, Agent, or Firm*—Ratner & Prestia

[57] ABSTRACT

In an echo canceller, a first adaptive filter (1) estimates an impulse response of an echo path between reception and transmission side by an NLMS algorithm to synthesize a pseud echo, while a second adaptive filter (3) determines whether there is an echo path change or a double talk. A voice detector (8) detects a short time power of the received input signal (x) to determine whether far-end speech is present or absent. The voice detector controls the second adaptive filter (3) to execute adaptation of the second adaptive filter for renewal of an impulse response of an echo path when far-end speech is present and otherwise to suspend the adaptation of the second adaptive filter when far-end speech is absent, while a double talk detector (9) controls the first adaptive filter to execute or suspend adaptation of the first adaptive filter according to the determination results of the voice detector.

20 Claims, 17 Drawing Sheets

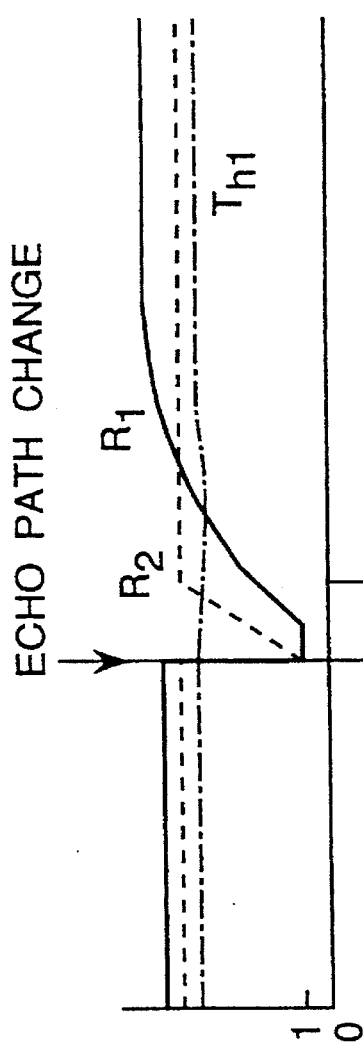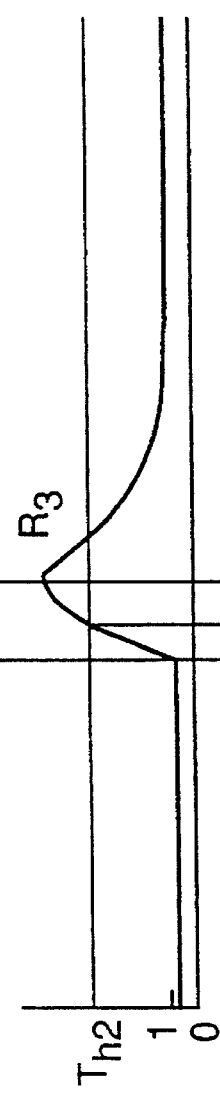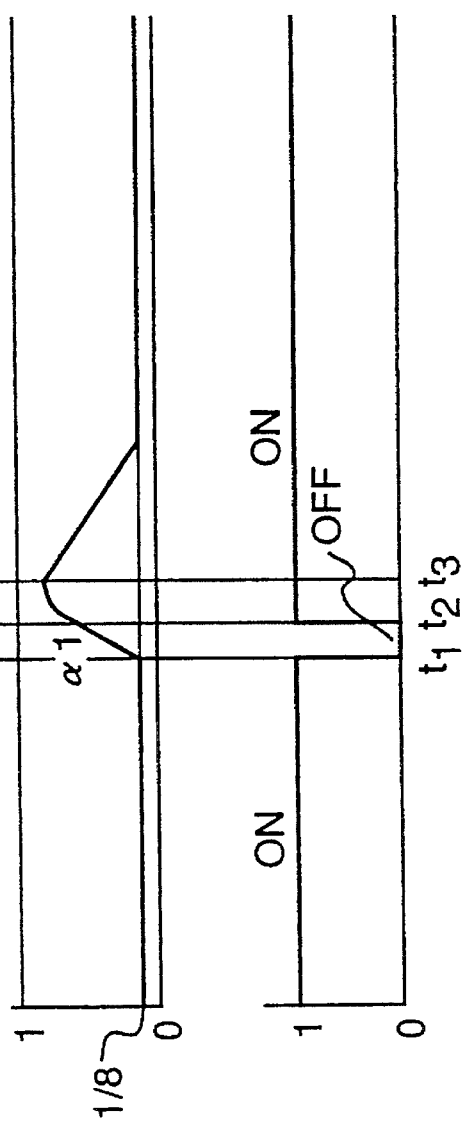
Fig.10(a)
Fig.10(b)
Fig.10(c)
Fig.10(d)

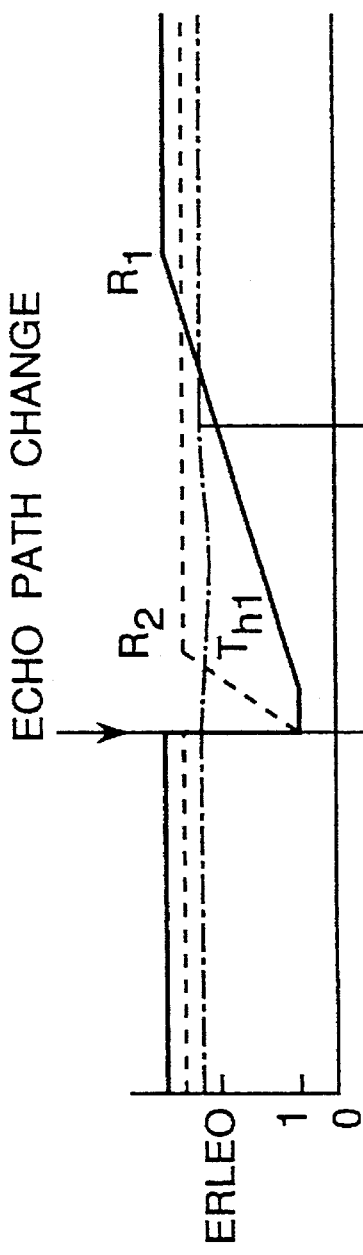
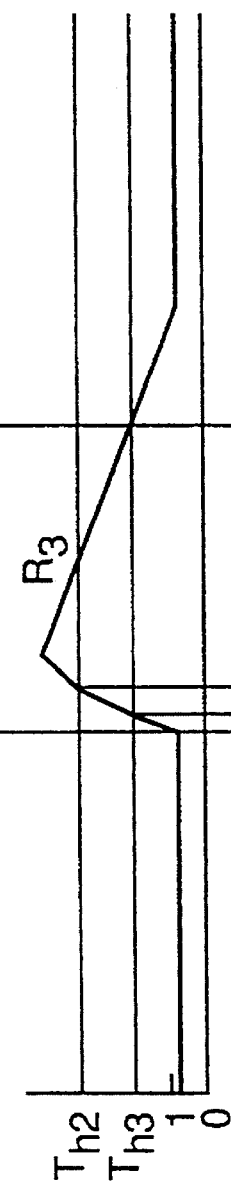
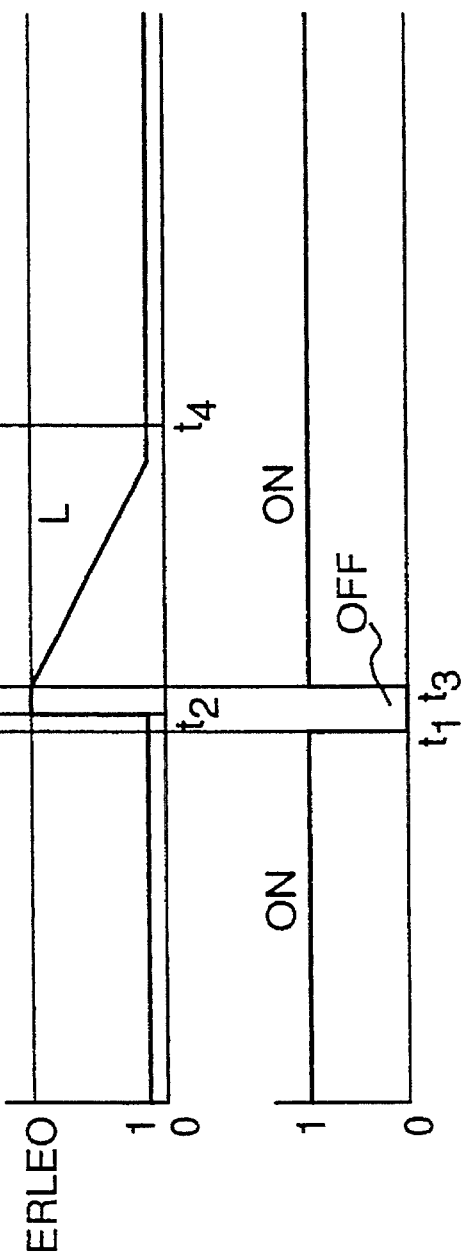
Fig. 13(a)
Fig. 13(b)
Fig. 13(c)
Fig. 13(d)

ECHO CANCELLER

BACKGROUND OF THE INVENTION

1. Field of the Invention

The present invention relates to an echo canceller for controlling acoustic echoes in loud telephone lines and teleconference systems as well as echoes in two-to-four line switching hybrid of telephone lines.

2. Description of the Prior Art

Acoustic echo cancellers generally used in teleconference systems are described here as an example. In a teleconference system, there are used loudspeakers and microphones to implement speech communication. Far-end speech sent from a far-end to a near end is loudened by a loudspeaker and reaches near-end speakers, while the far-end speech loudened by the loudspeaker is affected by reflection by walls and the like, and is entered to a microphone as an acoustic echo. The acoustic echo that has entered to the microphone is transferred to the far-end by line and then loudened by a loudspeaker in the far-end. To far-end speakers, the far-end speech returns back as an echo delayed to an extent of the line reciprocation.

In view of the above fact, there has been developed an acoustic echo canceller for cancelling an echo in which an impulse response of an acoustic echo path ranging from a loudspeaker to a microphone is estimated so as to convolute an input signal of a loudspeaker with the estimated impulse response together to thereby synthesize a pseud echo, and subtracting the pseud echo from sn output of the microphone.

Generally, an echo canceller adaptively estimates an impulse response of an echo path by using a spoken speech. To accurately estimate an impulse response of an acoustic echo path, it is required to renew the impulse response (hereinafter, referred to also as "adapt") when only a far-end speaker is speaking (referred to as a single talk). That is, it is natural that renewal of the impulse response be suspended when no far-end speaker is speaking or when only a near-end speaker is speaking, whereas renewal of the impulse response should also be suspended for a double-talk period during which both a near-end speaker and a far-end speaker are simultaneously speaking. Thus, an echo canceller is provided with a function of double talk detection for detecting a double talk and suspending the renewal of the impulse response.

Below described is an acoustic echo canceller as disclosed in the U.S. Pat. No. 4,894,820 which uses a double talk detector with reference to FIG. 17.

As shown in FIG. 17, a subtracter 129 determines the difference in level between the signals Lrin and Lres, and outputs a signal Acoms to an adder 130 and a threshold control section 131. The adder adds a margin to the signal Acoms to generate a signal FLG which is applied to the threshold control section 131. The threshold control section 131 receives Acoms and FLG, and then generates a variable double-talk detection threshold TRIM. A comparator 132 compares a signal Lrin with a reference signal XTH, and detects the idle state of the received signal Rin, and generates an estimation function inhibit signal INH and a control inhibit signal S32. When Lrin<XTH, an inhibit signal INH is generated to inhibit updating, and generates a control inhibit signal S32 to inhibit updating of the double-talk detection threshold TRIM by the threshold control section 131. Meanwhile, a comparator 133 compares a signal Lsin with a reference signal YTH, and detects the idle state of the signal Sin when Lsin<YTH. Then, a clear signal CL1 is generated to clear the estimation function inhibit signal INH to zero, and also generated is a clear signal CL2 to clear the double-talk detection threshold TRIM output from the threshold control section 131 to zero. A comparator 134 compares the threshold TRIM calculated by the threshold control section 131 and the signal FLG output by the adder 130. When TRIM≧FLG, the double-talk state is detected to inhibit the estimation function of an adaptive digital filter. When TRIM<FLG, the single-talk state is detected to set the inhibit signal INH to "0". The comparator 134 also generates a control signal S34 which selects the method of control of the threshold value TRIM according to the detected state.

Thus, the conventional double talk detector measures a short time power of an input signal to a loudspeaker and a short time power of an output of the echo canceller and calculates an averaged value of the ratio (Acom) of the short time power of the loudspeaker input signal to the short time power of the echo canceller output, thereby estimating a loss (TRIM) of the echo path including the echo canceller. In the case of a single talk, the value of Acom increases generally monotonously in the converging process where an adaptive filter, which is to estimate the impulse response of the echo path, has not enough estimated characteristics of the echo path, while Acom becomes an approximately constant value when the adaptive filter has enough estimated the characteristics of the echo path. As Acom increases, TRIM also increases gradually. In a single-talk state, a value (FLG) resulting from adding a slight margin to Acom becomes greater than TRIM. Since FLG is greater than TRIM, the double talk detector controls to execute renewal (updating) of a filter coefficient of the adaptive filter. In the case of a double-talk state, on the other hand, since a near-end speaker'signal is contained in an output signal of an echo canceller, the output of the echo canceller increases so that both Acom and FLG abruptly decrease until FLG becomes smaller than TRIM. Thus, the double talk detector, upon detection of the fact that FLG has become smaller than TRIM, suspends renewal of the impulse response, thereby preventing the impulse response estimated by the adaptive filter from being disturbed in the double-talk state.

When the echo path characteristic is changed due to such as movement of the near-end speaker or microphone or the like, the impulse response estimated by the adaptive filter and the impulse response of the after-change echo path do not agree with each other. As a result, there is an increasing residual echo so that FLG decreases as in a double-talk state, in which case the double talk detector suspends adaptation of the echo canceller. TRIM is gradually decreased for the period during which a received input is present and adaptation is kept suspended, so that the echo path change can be managed. After a while, TRIM becomes smaller than FLG, where the double talk detector resumes adaptation of the echo canceller.

The conventional double talk detector as described above may require a few seconds to discriminate between a double talk and an echo path change, during which time there will be generated an echo. Also, if TRIM is decreased at higher speed for the purpose of improving tracking performance with respect to a change of the echo path, the echo canceller would erroneously adapt to a long-time double talk, in some cases causing the filter coefficient of the echo canceller to be disturbed. In a literature, IEEE International Communications Conference Vol. 3 46.5 1985, "A Double Talk Detection Method for an Echo Canceller," based on the fact that 96% of double talks in 5-member teleconferences are occupied by those within 3 seconds, the period for suspending the renewal of the filter coefficient is limited within 3 seconds. However, in this case, there may take place a time delay of 3 seconds in maximum in response to an echo path change.

SUMMARY OF THE INVENTION

Accordingly, an essential objective of the present invention is to provide an echo canceller which ensures stability in response to a double-talk state in the same degree as in the conventional one and further which the echo canceller can promptly adapt to any echo path change upon its occurrence.

In order to achieve the above objective, the present invention provides an echo canceller which comprises: a first adaptive filter for estimating an impulse response of an echo path between reception and transmission side according to an NLMS (Normalized Least Mean Square) algorithm and convoluting a filter coefficient and a received input signal together to synthesize a first pseud echo only when it has been determined that it is in a single talk state; a first subtracter for subtracting the first pseud echo synthesized by the first adaptive filter from a transmitting input signal to thereby cancel an echo contained in the transmitting input signal, thus synthesizing a transmitting output signal; a second adaptive filter which is provided to determine whether it is an echo path change or a double talk, and which, when it has been determined that a received signal is present, renews a filter coefficient by an NLMS algorithm and convolutes the received input signal and the filter coefficient together to synthesize a second pseud echo; a second subtracter for subtracting the second pseud echo synthesized by the second adaptive filter from the transmitting input signal; a first input-output power ratio estimator for detecting short time power of input and output signals of the first subtracter and calculating the ratio therebetween (hereinafter, referred to as a first ratio); a second input-output power ratio estimator for detecting short time power of input and output signals of the second subtracter and calculating the ratio therebetween (hereinafter, referred to as a second ratio); a divider for dividing the second ratio by the first ratio; a voice detector for detecting short time power of the received input signal to determine whether far-end speech is present or absent; and a double talk detector for controlling to execute or suspend renewal of the filter coefficients of the first and second adaptive filters by using a determination result of the voice detector, the first and second ratios, and an output of the divider (hereinafter, referred to as a third ratio).

The second adaptive filter executes adaptation when the voice detector has detected far-end speech. When the voice detector has detected no far-end speech, the double talk detector suspends adaptation of the first adaptive filter. On the other hand, when it has been determined that far-end speech is present, the double talk detector controls to execute adaptation of the first adaptive filter if at least one of the following conditions (1) and (2) is satisfied:

(1) either of the first or the second ratio is greater than a first threshold; and (2) the third ratio is greater than a second threshold.

The first threshold is 1 as its initial value, and is variably controlled so as to gradually increase at a time constant slower than the converging speed of the first adaptive filter while the first adaptive filter is executing adaptation, where values in a range of approximately 25 to 100 at maximum are used for the first threshold. Also, the second threshold is a predetermined fixed value, being around 4 to 9, a small value compared with the first threshold.

With the above arrangement, the echo canceller of the present invention operates as follows.

In a single talk state, the voice detector detects far-end speech, where adaptation of the second adaptive filter is executed. The echo is cancelled by the second subtracter, and the second ratio increases monotonously. Meanwhile, the first threshold controlled by the double talk detector so as to increase slowly, so that the second ratio becomes greater than the first threshold. Thus, the double talk detector controls to execute adaptation of the first adaptive filter.

In a double talk period, near-end speech is added to the echo and, passing through the first and second subtracters, appears in their outputs, thus causing the first and second ratios to abruptly decrease. If a double talk takes place, the first and second ratios become smaller than the first threshold. Further, since the first and second ratios decrease in like manner, the third ratio becomes approximately 1, smaller than the second threshold. As a result, the double talk detector suspends adaptation of the first adaptive filter, so that the filter coefficient of the first adaptive filter is no longer renewed. Thus, the coefficient of the first adaptive filter can be prevented from being disturbed by near-end speech.

In an early stage following an echo path change, there will be an increased difference between the impulse response of the echo path that has changed and the impulse response estimated by the first and second adaptive filters, so that the echo will not be cancelled by the first and second subtracters. The moment that the echo path has changed, the first and second ratios decrease as in a double talk, where the double talk detector suspends adaptation of the first adaptive filter whereas the second adaptive filter executes adaptation. As a result, the impulse response estimated by the second adaptive filter gradually approaches the impulse response of the echo path that has changed, allowing the second subtracter to cancel the echo. Since adaptation of the first adaptive filter is suspended, the first ratio remains approximately unchanged after the echo path change, while only the second ratio is gradually increasing. Thus, the third ratio resulting from dividing the second ratio by the first ratio increases until it becomes greater than the second threshold. The double talk detector detects that the third ratio has become greater than the second threshold, and controls to immediately execute adaptation of the coefficient of the first adaptive filter. The time required for the third ratio to become greater than the second threshold is only a slight time required for the second adaptive filter to increase the echo return loss enhancement to a degree of approximately 6 to 10 dB.

Whereas time was used to discriminate between a double talk and an echo path change in the prior art, the present invention uses the second adaptive filter to discriminate between the two essentially and yet in short time. As a result, the echo canceller of the present invention can substantially improve the tracking performance to echo path changes.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 10(a), 10(b), 10(c) and 10(d) are timing charts for explaining the principle of step gain control in the echo canceller of the second embodiment;

FIGS. 13(a), 13(b), 13(c) and 13(d) are timing charts for explaining the principle of loss control in transmitting output in the echo canceller of the third embodiment;

DESCRIPTION OF THE PREFERRED EMBODIMENTS

Figure 1:
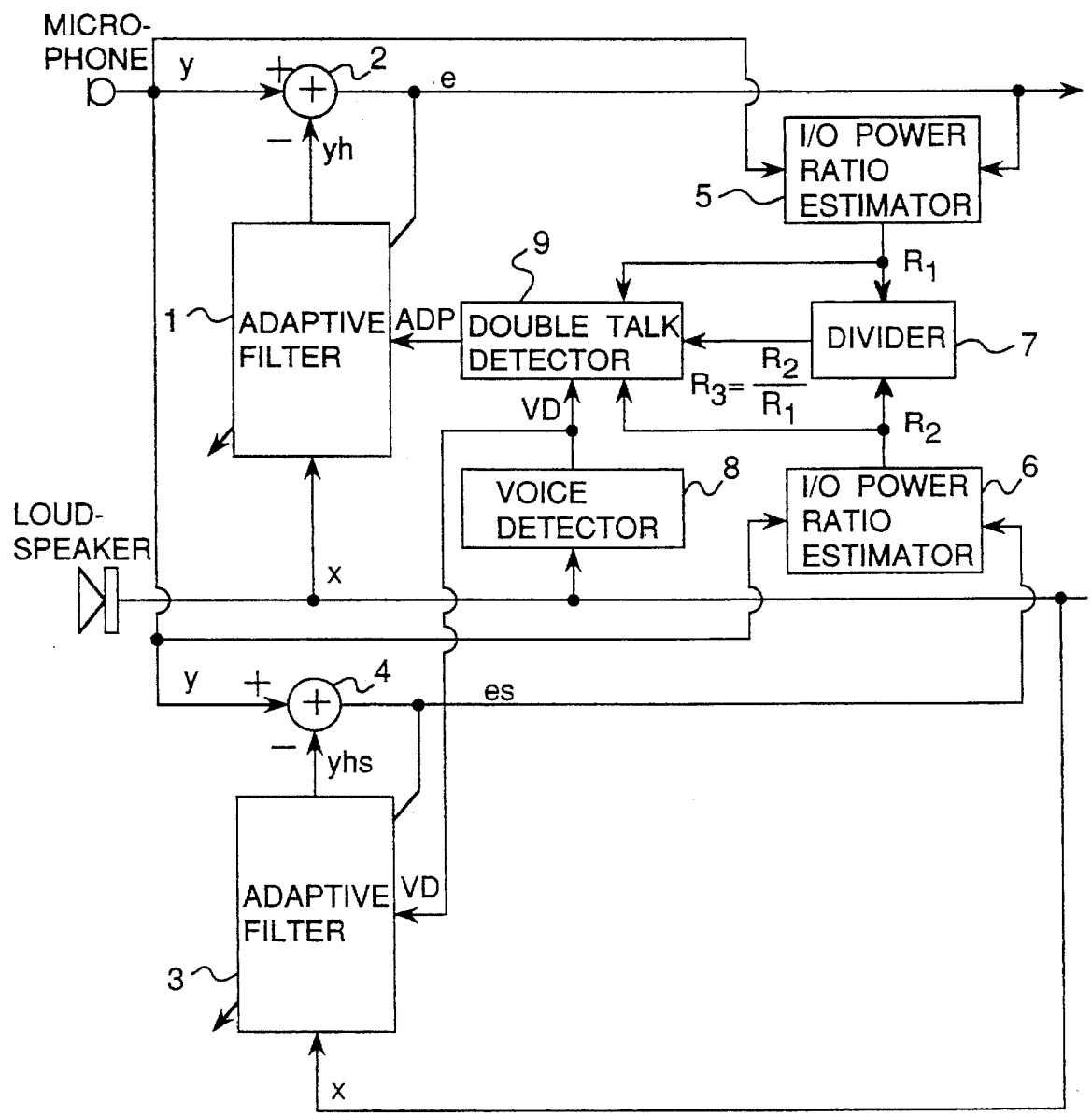
FIG. 1 is a block diagram showing a construction of an echo canceller according to a first embodiment of the present invention.

Before the description proceeds, it is to be noted that, since the basic structures of various preferred embodiments are in common, like parts are designated by the same reference numerals throughout the accompanying drawings.

A first embodiment of the present invention is described with reference to FIGS. 1 to 7.

FIG. 1 shows a construction of an echo canceller according to a first embodiment of the present invention. It is assumed that signal processing in the following description is performed all in digital form and that the signal is sampled at a frequency of 8 kHz. Referring to FIG. 1, the echo canceller includes a first adaptive filter 1, a first subtracter 2, a second adaptive filter 3, a second subtracter 4, a first input-output power ratio estimator 5 for calculating an input-output power ratio R1 of the first subtracter 2, and a second input-output power ratio estimator 6 for calculating an input-output power ratio R2 of the second subtracter 4, where the first and second adaptive filters 1 and 3 renew their filter coefficients by NLMS (Normalized Least Mean Square). In FIG. 1, the echo canceller further includes a divider 7 for dividing the second ratio R2 by the first ratio R1 (hereinafter, R2/R1=R3 is referred to as "a third ratio"), and a voice detector 8 for detecting short time power of a received input signal to detect whether far-end speech is present or absent, where the second adaptive filter 3 executes adaptation when the voice detector 8 has detected a far-end speech. In the echo canceller, a double talk detector 9 controls to estimate an impulse response of an echo path of the first adaptive filter 1 when, as a result of the voice detector 8 having detected far-end speech, either one of the first and second ratios R1 and R2 is greater than a first threshold Th1 or the third ratio R3 is greater than a second threshold Th2 (Th2=2, fixed in the embodiments).

The first adaptive filter 1 synthesizes a pseud echo Yh by formula (1), in more detail, the first adaptive filter 1 estimates an impulse response of an echo path between a reception side of a signal x and a transmission side of a signal y, holding the estimated impulse response as a filter coefficient, and convoluting the filter coefficient together with a received input signal to thereby synthesize a pseud echo Yh. The first subtracter 2 subtracts the pseud echo synthesized by the first adaptive filter 1 from a transmitting input signal y to cancel an echo contained in the transmitting input signal according to formula (2), thus yielding an output (e), where the first adaptive filter 1 is renewing a filter coefficient series $\{h_0, h_1, \ldots, h_{N-1}\}$ by an NLMS (Normalized Least Mean Square) algorithm as represented in formula (3). The second adaptive filter 3 similarly estimates an impulse response of the echo path, and holds the estimated impulse response as a filter coefficient, convoluting the received input signal together with the filter coefficient to thereby synthesize a pseud echo Yhs. The second adaptive filter 3 synthesizes the pseud echo Yhs according to formula (4) like the first adaptive filter 1. The second subtracter 4 subtracts the pseud echo (Yhs) synthesized by the second adaptive filter 3 from the transmitting input signal to thereby cancel the echo according to formula (5), where the second adaptive filter 3 is renewing a filter coefficient series $\{hs_{d\,0}, hs_1, \ldots, hs_{N-1}\}$ by an NLMS algorithm as represented in formula (6). As for denotation, N is the order of an adaptive filter, j is a sample number, x is a reference input signal, y is a transmitting input, e is an output of the first subtracter 2, and es is an output of the second subtracter 4. It is assumed that a step gain α1 of the NLMS algorithm of the first adaptive filter 1 is set as small as α1=¼ so that a greater amount of indoor echo return loss enhancement can be obtained finally. A step gain α2 of the second adaptive filter 3 is set to α2=1 where the converging speed is the fastest so that echo path change and double talk can be discriminated from each other in short time. In the embodiments, it is also noted here that the echo canceling time of the first and second adaptive filters is assumed to be 250 msec.

$$yh(j) = \sum_{i=0}^{N-1} h_i(j) \cdot x(j-i) \quad (1)$$

$$e(j) = y(j) - yh(j) \quad (2)$$

$$h_i(j+1) = h_i(j) + \alpha 1 \cdot e(j) \cdot x_i(j) / \sum_{n=0}^{N-1} \cdot x(n-i)^2 \quad (3)$$

$$yhs(j) = \sum_{i=0}^{N-1} hs_i(j) \cdot x(j-i) \quad (4)$$

$$es(j) = y(j) - yhs(j) \quad (5)$$

-continued $$hs_i(j+1) = hs_i(j) + \alpha 2 \cdot es(j) \cdot x_i(j) / \sum_{n=0}^{N-1} \cdot x(n-i)^2 \quad (6)$$

Figure 2:
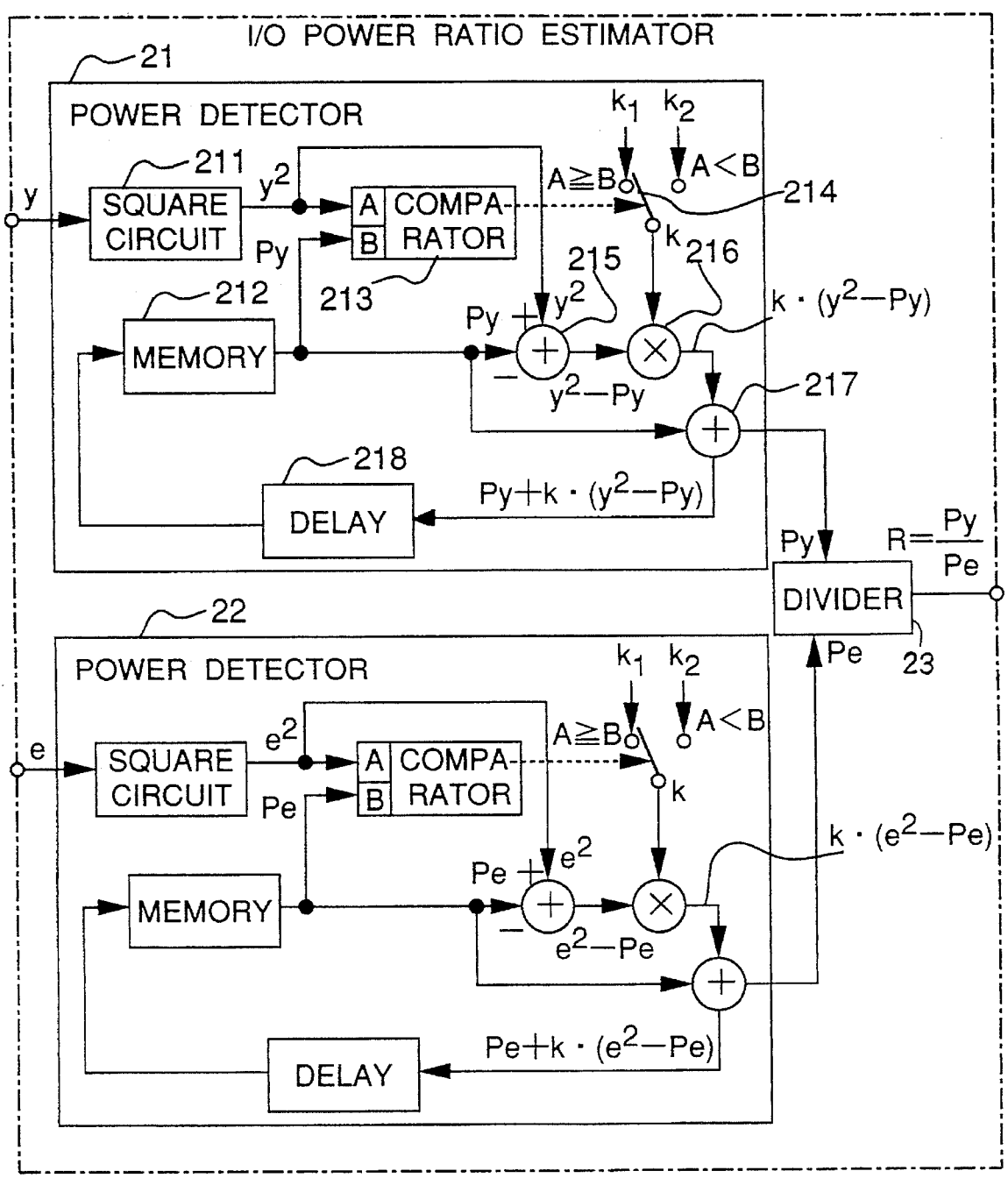
FIG. 2 is a block diagram showing a detailed construction of an input-output power ratio estimator of the first embodiment.

FIG. 2 shows a detailed construction of the input-output power ratio estimator 5, which includes a pair of power detectors 21 and 22 each having a similar construction for measuring a short time power of signals. A divider 23 divides input power detected by the power detector 21 by an output power detected by the power detector 22.

The construction of the power detector 21 is now described. Referring to FIG. 2, the estimator is provide with a square circuit 211 for calculating a square of an input signal y, a memory 212 for storing a short time average power of the input signal y, a comparator 213 for comparing a previous power value Py stored in the memory with an output $y^2$ of the square circuit 211 and, when the output $y^2$ of the square circuit is greater than the previous stored power Py, yielding an output of 1. A switch 214 selects a constant k1 when the comparator 213 has yielded an output of 1, and otherwise selects a constant k2. A subtracter 215 subtracts an output of the memory 212 from the output of the square circuit 211 while a multiplier 216 calculates a product of an output of the subtracter 215 and a constant selected by the switch 214. An adder 217 adds together an output of the multiplier 216 and the output of the memory 212 to yield an output of short time power of the signal, which the output of the adder 217 is delayed by a delay unit 218 and transferred to the memory 212. With the above-described arrangement of the power detector 21 and 22 having the constants k1 set relatively large and k2 set relatively small, the power detectors 21, 22 are capable of detecting without time lag the power of a signal whose leading edge of amplitude is steep and trailing edge is relatively gentle such as of speech. The constants are set to, for example, k1=0.01, k2=0.001, in the case of a sampling frequency of 8 kHz. The second input-output power ratio estimator 6 is similar in construction to FIG. 2.

Figure 3:
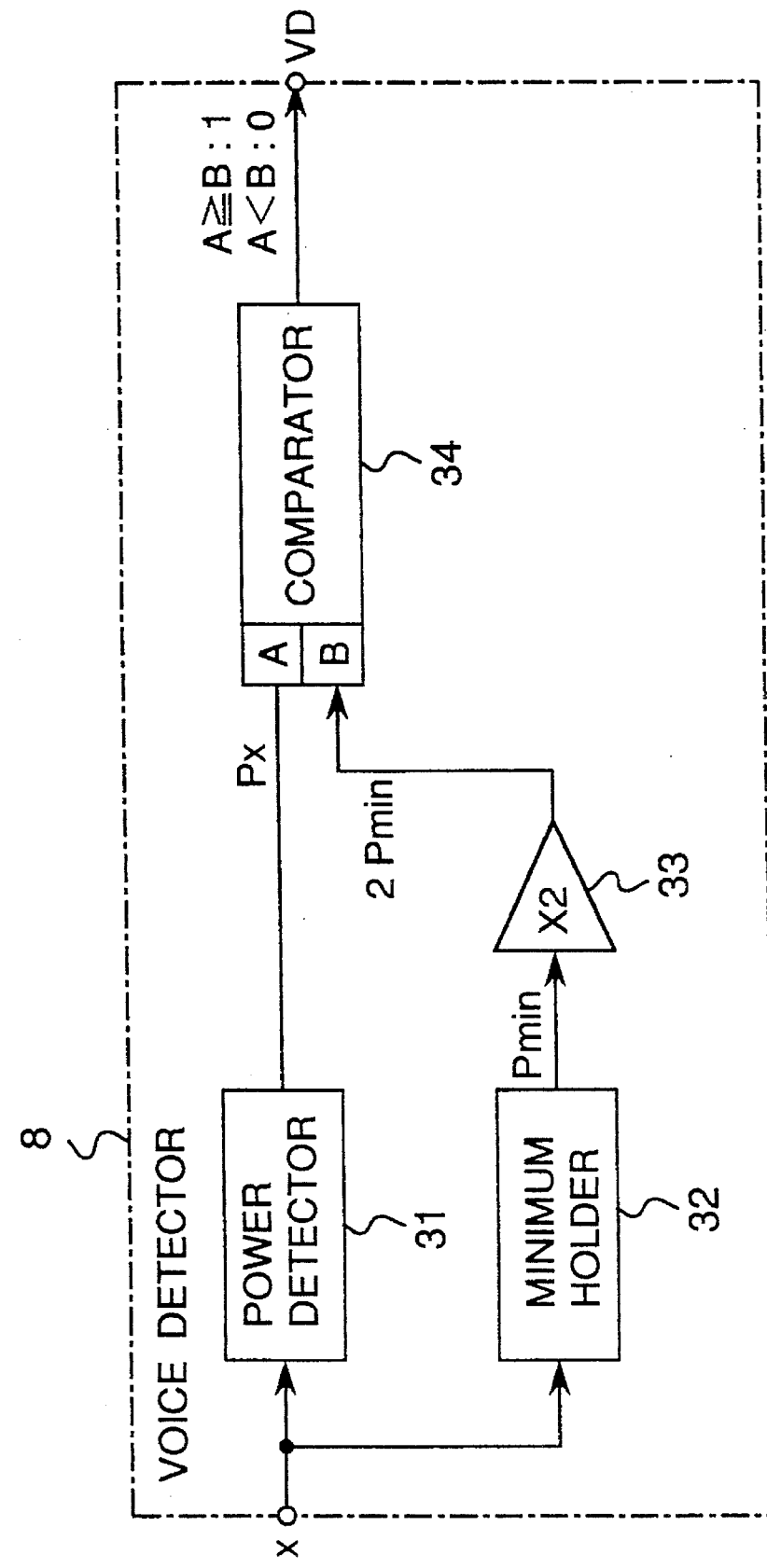
FIG. 3 is a block diagram showing a detailed construction of a voice detector of the first embodiment.

The voice detector 8 is constructed in the same manner as in the conventional one, which makes use of a conventionally available detection method as shown in FIG. 3. Referring to FIG. 3, a power detector 31 is the same as the power detector 21 or 22 for detecting a short time power as in FIG. 2. A minimum holder 32, although similar in construction to the power detector 31, has its constants k1 and k2 set as to detect the minimum Pmin of the signal power, where k1 is set small and k2 is set large, e.g. k1= 0.00001, k2=0.001. An amplifier 33 doubles an output Pmin of the minimum holder 32, and a comparator 34 compares received signal power Px detected by the power detector 31 with an output 2Pmin of the amplifier 33. When the output of the power detector 31 is greater than the output of the amplifier 33 (i.e., Px≧2Pmin), the comparator 34 yields an output of VD=1 based on a detection that speech is present,.

Figure 4:
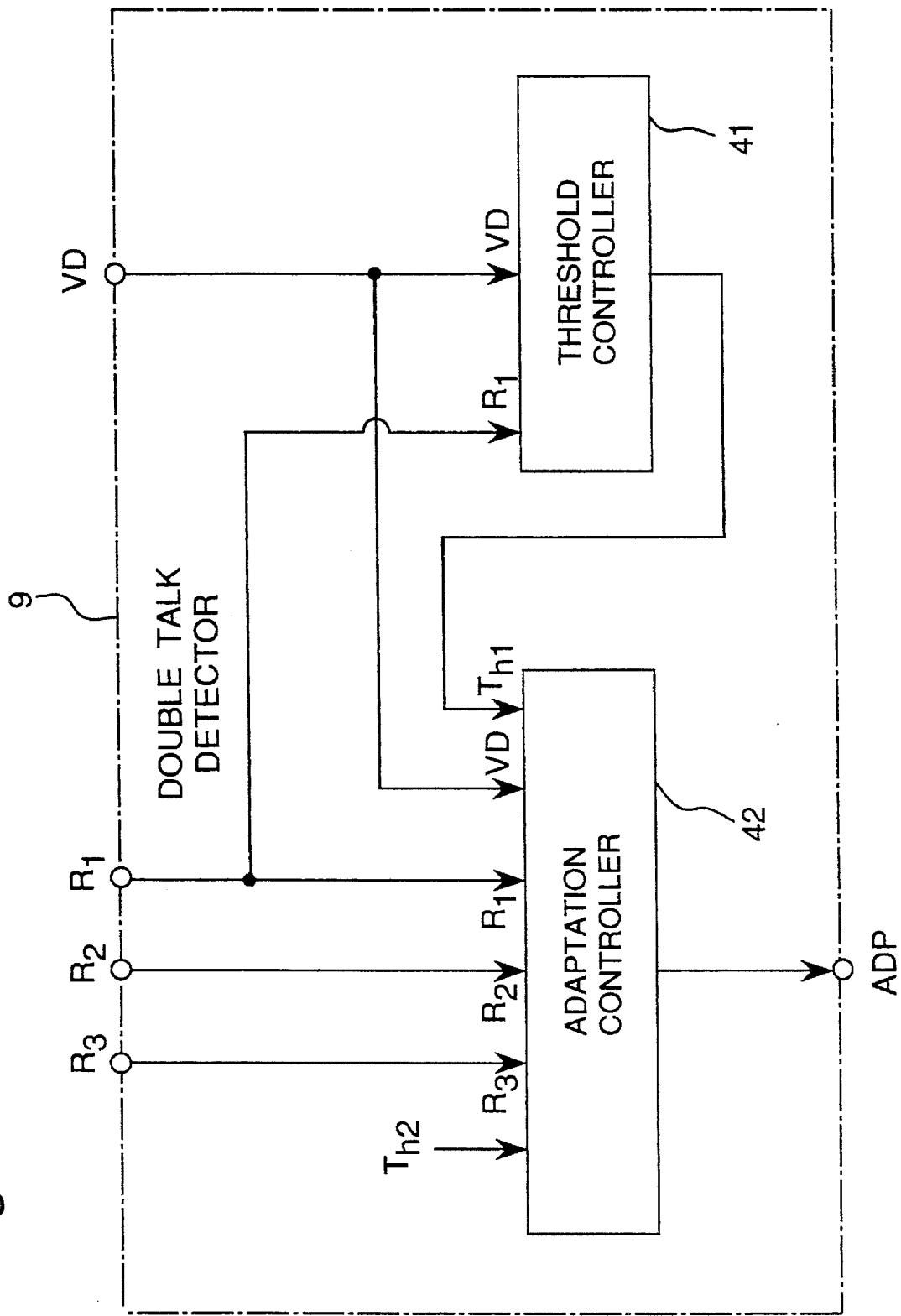
FIG. 4 is a block diagram showing a detailed construction of a double talk detector of the first embodiment.

FIG. 4 shows a detailed construction of the double talk detector 9. Referring to FIG. 4, a threshold controller 41 controls the first threshold Th1 in such a following way. The first threshold Th1 is gradually increased so as not to exceed the first ratio R1 when the voice detector 8 has determined that far-end speech is present and besides the first ratio Rt is greater than the first threshold Th1. Whereas, the threshold controller 41 makes the first threshold Th1 decrease very slowly when R1 is smaller than the current threshold Th1 irrespective of the presence of received speech. Further, the threshold controller 41 holds the previous value of the first threshold Th1 when it has been determined that no speech is present. An adaptation controller 42 determines to execute adaptation of the first adaptive filter 1 when the voice detector 8 has determined that speech is present and besides when either one of the first and second ratios R1 and R2 is greater than the first threshold Th1 or when the third ratio R3 is greater than the second threshold Th2.

Figure 5:
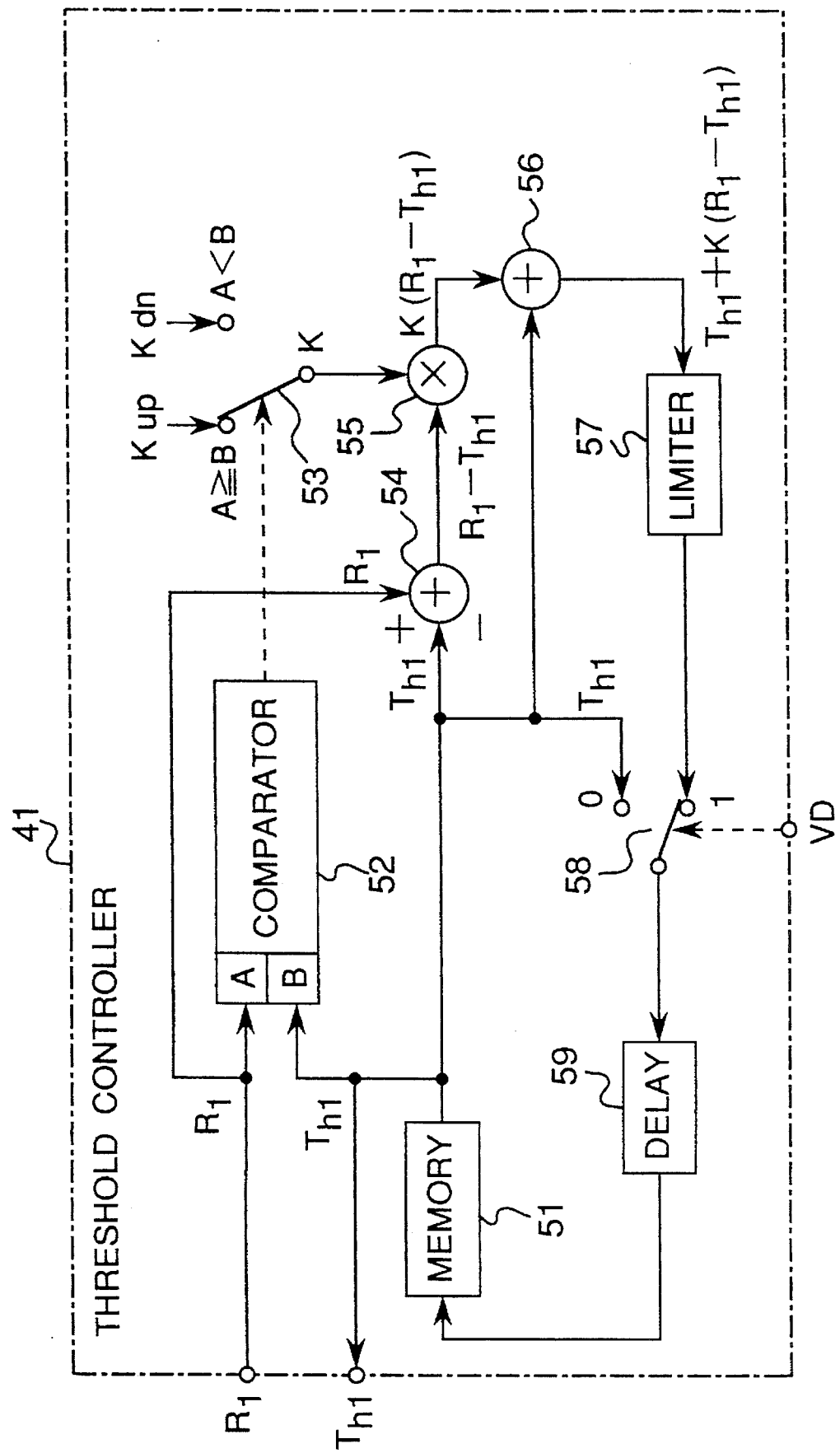
FIG. 5 is a block diagram showing a detailed construction of a threshold controller of the first embodiment.

FIG. 5 shows a detailed construction of the threshold controller 41. Referring to FIG. 5, the threshold controller 41 includes a memory 51 for storing a threshold Th1 and a comparator 52 for comparing the first ratio R1 with the threshold Th1. A switch 53 selects a constant Kup when the comparator 52 has determined that R1 is greater than Th1 and otherwise selects a constant Kdn. A subtracter 54 subtracts Th1 from R1, and a multiplier 55 calculates a product of a time constant K selected by the switch 53 and an output (R1–Th1) of the subtracter 54. An adder 56 then adds together an output of the multiplier 55 and the threshold Th1. Further, a limiter 57 limits the maximum and minimum of an output of the adder 56. A switch 58 is controlled by the voice detector 8 in response to the output signal VD thereof. The switch 58 selects an output Of the limiter 57 when speech is present, and selects an output of the memory 51 when no speech is present. A delay unit 59 delays an output of the switch 58 by one sample and the resultant output is transferred to the memory 51. Referring to the constants Kup and Kdn selected by the switch 53, the constant Kup is a constant determined by a formula Kup=Ts/Tup, where Ts is sampling frequency and Tup is time constant. Likewise, the constant Kdn is a constant determined by a formula Kdn= Ts/Tdn, where Tdn is time constant. In the embodiments, it is assumed that Tup is relatively short, approx. 500 msec, and Tdn is a very long time constant around 30 sec.

The threshold controller 41 with the above-described arrangement performs the control in such a way that, when no received speech has been detected by the voice detector 8, the switch 58 selects an output of the memory 51 to be applied to the input of the delay unit 59, so that a previous value of the threshold stored in the memory 51 is held. Whereas, when speech has been detected by the voice detector 8, the first threshold is renewed in the following way. That is, the first ratio R1 and the first threshold Th1 are compared with each other by the comparator 52, where, when R1≧Th1, the constant Kup is selected by the switch 53 and, when R1<Th1, the constant Kdn is selected by the switch 53. Assuming that the result of calculations by the subtracter 54, the multiplier 55, and the adder 56 is Th, then the value Th can be represented by the following formula (7):

$$Th = Th1 + Kup(R1 - Th1) \quad \text{when } R1 \geq Th1, \quad (7)$$
$$Th = Th1 + Kdn(R1 - Th1) \quad \text{when } R1 < Th1$$

The above formula represents that the value Th is calculated so as to gradually approach to R1 by the time constant Tup or Tdn. When R1≧Th1, the constant Kup is selected by the switch 53, where Th approaches to R1 by a time constant of 500 msec. When R1<Th1, the constant Kdn is selected by the switch 53, where Th approaches to R1 by a time constant of 30 sec. When the resultant calculation value Th by formula (7) is smaller than '1', the limiter 57 limits the threshold to '1'. When the resultant value is greater than a predetermined first threshold upper limit Th1max, the limiter 57 limits the threshold to Th1max, thereby arranging the first threshold Th1 to fall within an appropriate range. The threshold upper limit Th1max is assumed to be 25.

Figure 6:
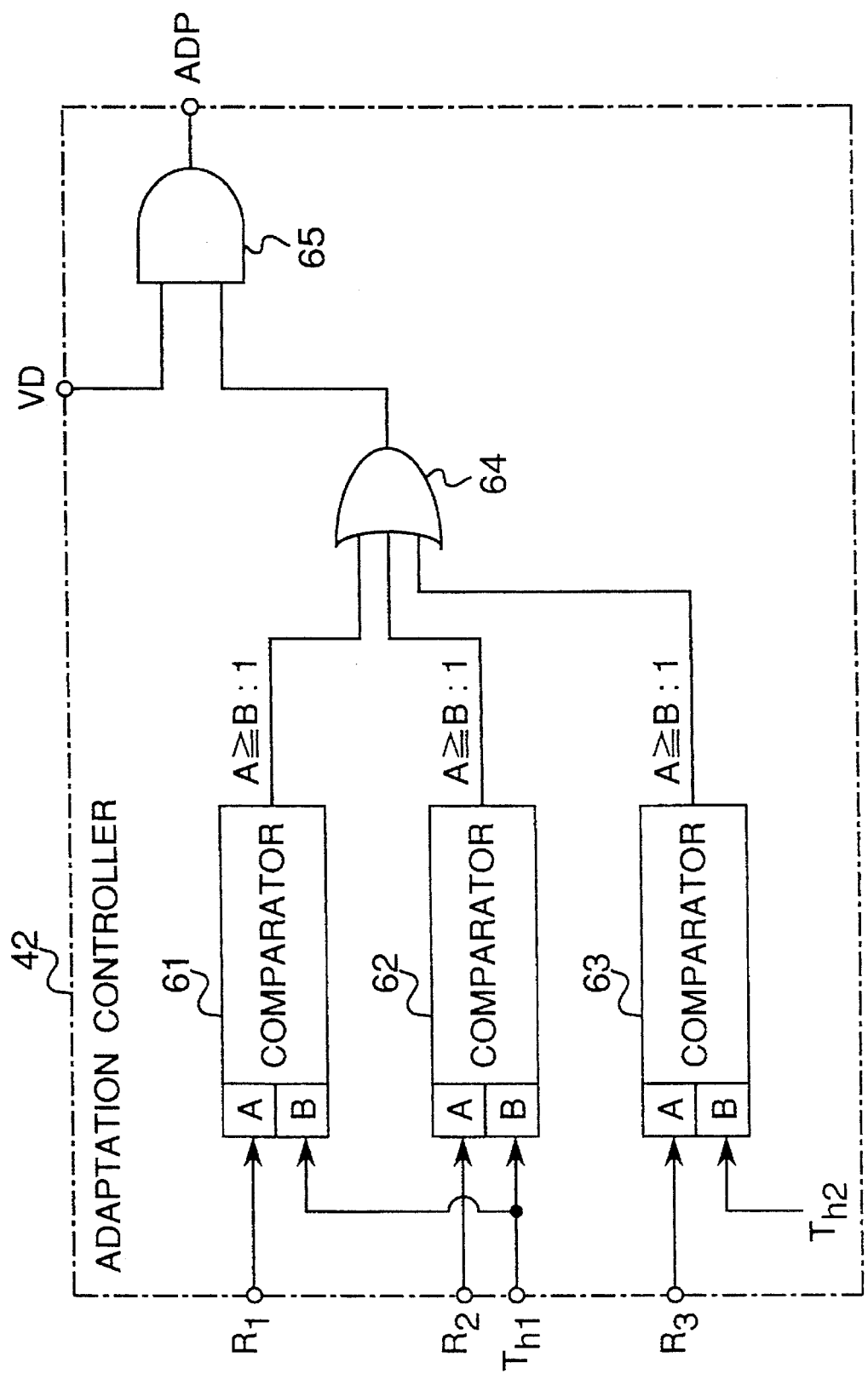
FIG. 6 is a block diagram showing a detailed construction of an adaptation controller of the first embodiment.

FIG. 6 shows a detailed construction of the adaptation controller 42. A comparator 61 compares the first threshold Th1 with the first ratio R1 and yields an output of '1' when R1≧Th1 and otherwise an output of '0'. A comparator 62 compares the first threshold Th1 with the second ratio R2 and yields an output of '1' when R2≧Th1 and otherwise an output of '0'. A comparator 63 compares the third ratio R3 with the second threshold Th2 and yields an output of '1' when R3≧Th2 and otherwise an output of '0'. An OR circuit 64 determines a logical OR among outputs of the comparators 61, 62, and 63. An AND circuit 65 determines a logical AND between an output VD of the voice detector 8 and an output of the OR circuit 64, where adaptation of the first adaptive filter 1 in FIG. 1 is executed when the output ADP of the AND circuit 65 is '1' while the adaptation is suspended when the output is '0'.

Figure 7A:
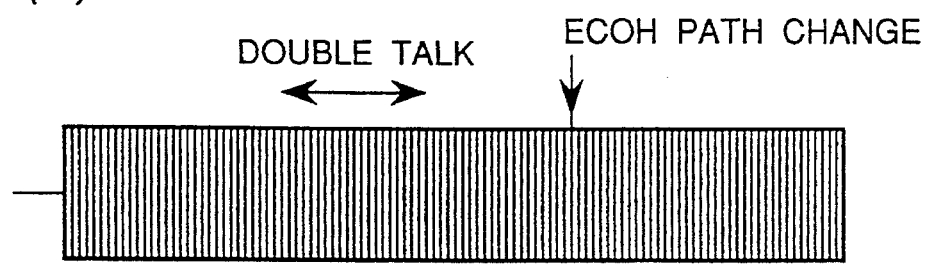
FIGS. 7(a), 7(b), 7(c), 7(d), 7(e) and 7(f) are timing charts for explaining the principle of double talk detection in the echo canceller of the first embodiment.

Regarding the echo canceller with the above-described arrangement, its operation is described below with reference to FIGS. 7(a) through 7(f) which is an explanatory view of the principle of double talk detection. In FIGS. 7(a) through 7(f), for the sake of explanation of principle, although it is assumed that the levels of far-end speech and near-end speech are constant, the same operational principle can be similarly applied to the cases of unsteady signals such as speech signals, where FIG. 7(a) shows a chart of far-end speech; 7(b) shows a chart of near-end speech; 7(c) shows a chart of short time power Py of a transmission input signal y composed of an echo and a near-end speaker signal, short time power Pe of an output signal e of the first subtracter 2, and short time power Pes of an output signal es of the second subtracter 4; 7(d) shows a chart of the first and second ratios R1 and R2 and the first threshold Th1; 7(e) shows a chart of the third ratio R3 and the second threshold Th2; and 7(f) shows a chart of execution/suspension of adaptation of the first adaptive filter 1. A double talk takes place during a period of t1–t2, and echo path characteristic changes at t3.

Figure 7B:
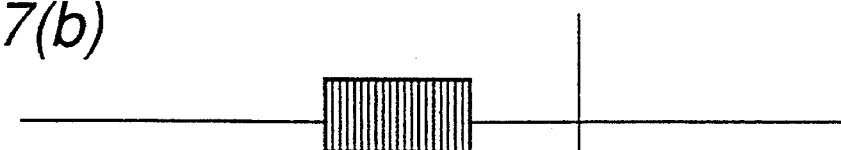
Figure 7C:
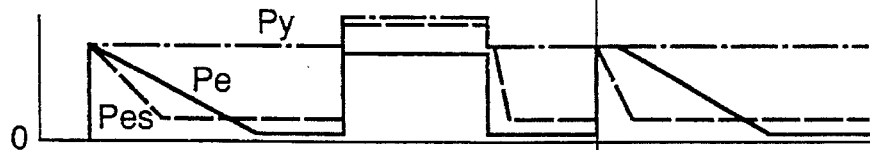
Figure 7D:
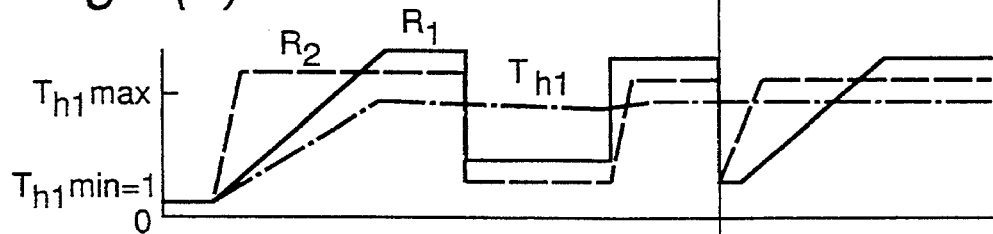
Figure 7E:
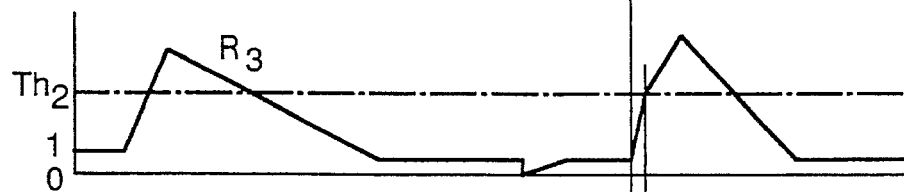
Figure 7F:
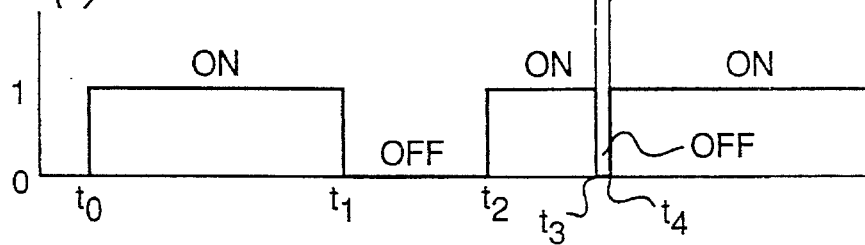

First discussed is a single talk state in which a far-end speaker only is speaking, which the period is represented by an interval of t0–t1 in FIG. 7(f). The voice detector 8 detects the far-end speech to transmit an output signal VD to the second adaptive filter 3, thereby controlling to execute adaptation of the second adaptive filter 3. Then the second subtracter 4 cancels the echo, so that the short time power Pes of the output signal es of the second subtracter 4 (indicated by broken line in FIG. 7(c)) gradually decreases, while the output R2 of the second input-output power ratio estimator 6 (broken line in FIG. 7(d)) gradually increases. The first threshold Th1 of the double talk detector 9 (one-dot chain line in FIG. 7(d)) has been initialized to be set at Th1=1. The comparator 62 of the adaptation controller 42 detects the fact that the second ratio R2 is greater than the first threshold Th1, yielding an output of '1', so that the output of the OR circuit 64 becomes '1'. The AND circuit 65 operates for obtaining AND between the voice detector 8 and the OR circuit 64, yielding an output of '1'. The adaptation controller 42 finally determines to execute adaptation of the first adaptive filter 1. Then the adaptation of the first adaptive filter 1 is executed, so that the first ratio R1 becomes greater than the first threshold Th1. The threshold controller 41 performs control so that Th1 gradually approaches R1 by the time constant Tup when R1≧Th1, with Th1 gradually increasing. On the other hand, if adaptation of the first adaptive filter 1 is continued in a single talk state, the filter coefficient approaches generally monotonously to the impulse response of the echo path. Accordingly, the output signal power Pe of the first subtracter 2 gradually decreases, while the input-output power ratio R1 increases generally monotonously. Thus, in a single talk state, the relationship of R1≧Th1 or R2≧Th1 is maintained, so that the adaptation of the first adaptive filter 1 continues to be executed.

Next discussed is the double talk state which is represented by an interval of t1–t2 in FIG. 7(f), where during the period of t1–t2, the near-end speech shown in FIG. 7(b) is added to the echo. Since the first and second subtracters 2 and 4 do not cancel the near-end speech, therefore the output power Pe of the first subtracter 2 (shown by solid line in FIG. 7(c)) and Pes of the second subtracter 4 (shown by broken line in FIG. 7(c)) abruptly increase. As a result, the first and second ratios R1 and R2 abruptly decrease so as to become smaller than the first threshold Th1. Meanwhile, since the second adaptive filter 3 continues adaptation, the filter coefficient is disturbed, so that the output power Pes of the second subtracter 4 becomes greater than the output power Pe of the first subtracter 2 while the second ratio R2 becomes smaller than the first ratio R1. The third ratio R3 (represented by solid line in FIG. 7(e)) becomes less than 1, smaller than the second threshold Th2 (represented by one-dot chain line in FIG. 7(e)). Thus, in the adaptation controller 42 of the double talk detector 9, the comparators 61 and 62 compare the first and second ratios R1 and R2 with the first threshold Th1, yielding an output of '0' in both cases. Meanwhile, the comparator 63 compares the third ratio R3 with the second threshold Th2, yielding an output of '0'. As a result, the output of the OR circuit 64 is a '0'. The AND circuit 65 operates for obtaining AND between the voice detector 8 and the OR circuit 64, yielding an output of '0'. The adaptation controller 42 finally determines to suspend the adaptation of the first adaptive filter 1. Thus, when a double talk takes place, the double talk detector 9 transmits the output signal ADP of logic '0' to the adaptive filter 1 to immediately suspend the adaptation of the first adaptive filter 1, thus effectively preventing the filter coefficient from being disturbed by the double talk. In a double talk period, the first ratio R1 becomes smaller than the first threshold Th1, so that the threshold controller 41 performs control so that Th1 approaches to R1 very slowly by a time constant Tdn of 30 sec. Thus, even if the double talk continues for a long time over 3 seconds, the double talk detector 9 will never err in determination on adaptation of the first adaptive filter 1.

Lastly discussed is a case where the echo path characteristic has rapidly changed due to movement of the speaker or microphone or the like, which the period starts at t3 in FIG. 7(f). When the echo path is rapidly changed, there will be an increased difference between the impulse response of the changed echo path and the impulse responses estimated by the first and second adaptive filters 1 and 3 in an early stage of the change of the echo path. The difference in impulse response becomes so large that the first and second subtracters 2 and 4 can not cancel the echo. Accordingly, the moment the echo path has undergone the change, the output power Pe and Pes of the first and second subtracters 2 and 4 abruptly increase at t3, so that the first and second ratios R1 and R2 abruptly become smaller than the first threshold Th1. At the moment t3 when the echo path has changed, the first and second ratios R1 and R2 are smaller than the first threshold Th1 as shown in FIG. 7(d), and the third ratio R3 is also smaller than the second threshold Th2 as shown in FIG. 7(e). Therefore, the moment the echo path characteristic has changed, the adaptation controller 42 suspends the adaptation of the first adaptive filter 1, which the suspension period is represented by an OFF interval t3–t4 in FIG. 7(f).

If the voice detector 8 has determined that a speech signal is present, the double talk detector 9 controls to renew the filter coefficient of the second adaptive filter 3, so that the impulse response estimated by the second adaptive filter 3 gradually approaches to the impulse response of the echo path that has changed. In this period t3–t4, the second subtracter 4 goes on cancelling the echo, so that its output power Pes gradually decreases. Since adaptation of the first adaptive filter 1 has been suspended, the first ratio R1 remains approximately unchanged after the echo path has changed, while the second ratio R2 alone gradually increases as shown in FIG. 7(d). Therefore, the third ratio R3 resulting from dividing the second ratio R2 by the first ratio R1 increases like the second ratio R2. The third ratio R3 becomes greater than the second threshold Th2 at t4 after a while, so that the comparator 63 of the adaptation controller 42 yields an output of '1'. The OR circuit 64 yields an output of '1' and also the AND circuit 65 yields an output ADP of logic '1'. Thus, the double talk detector 9 controls to execute the adaptation of the first adaptive filter 1.

As the convergence of the first adaptive filter 1 progresses, the first ratio R1 also increases so as to gradually approach to the second ratio R2, while the third ratio R3 gradually decreases so as to become lower than the second threshold Th2. However, by this time point, the second ratio R2 has become greater than the first threshold Th1, so that the adaptation of the first adaptive filter 1 is continued. The duration of t3–t4 required for the third ratio R3 to become greater than the second threshold Th2 is only a slight time required for the second adaptive filter 3 to increase the echo return loss enhancement to an extent of around 6 to 10 dB.

As described above, in this embodiment, even when the echo path has undergone change, the adaptation of the first adaptive filter is started earlier than in the conventional method, so that the tracking performance with respect to echo path change can be improved, compared with the prior art. Also, the speed of decreasing the first threshold Th1 is much slower than that in the conventional one even in a double talk state as shown in FIG. 7(d). Therefore, the double talk detector will never misexecute adaptation of the first adaptive filter even in the case of a prolonged double talk state. Thus, the echo canceller of the present embodiment can perform more stable operation with respect to the double talk state than in the prior art.

Second embodiment

Now a second embodiment of the present invention is described with reference to FIGS. 8 to 10.

Figure 8:
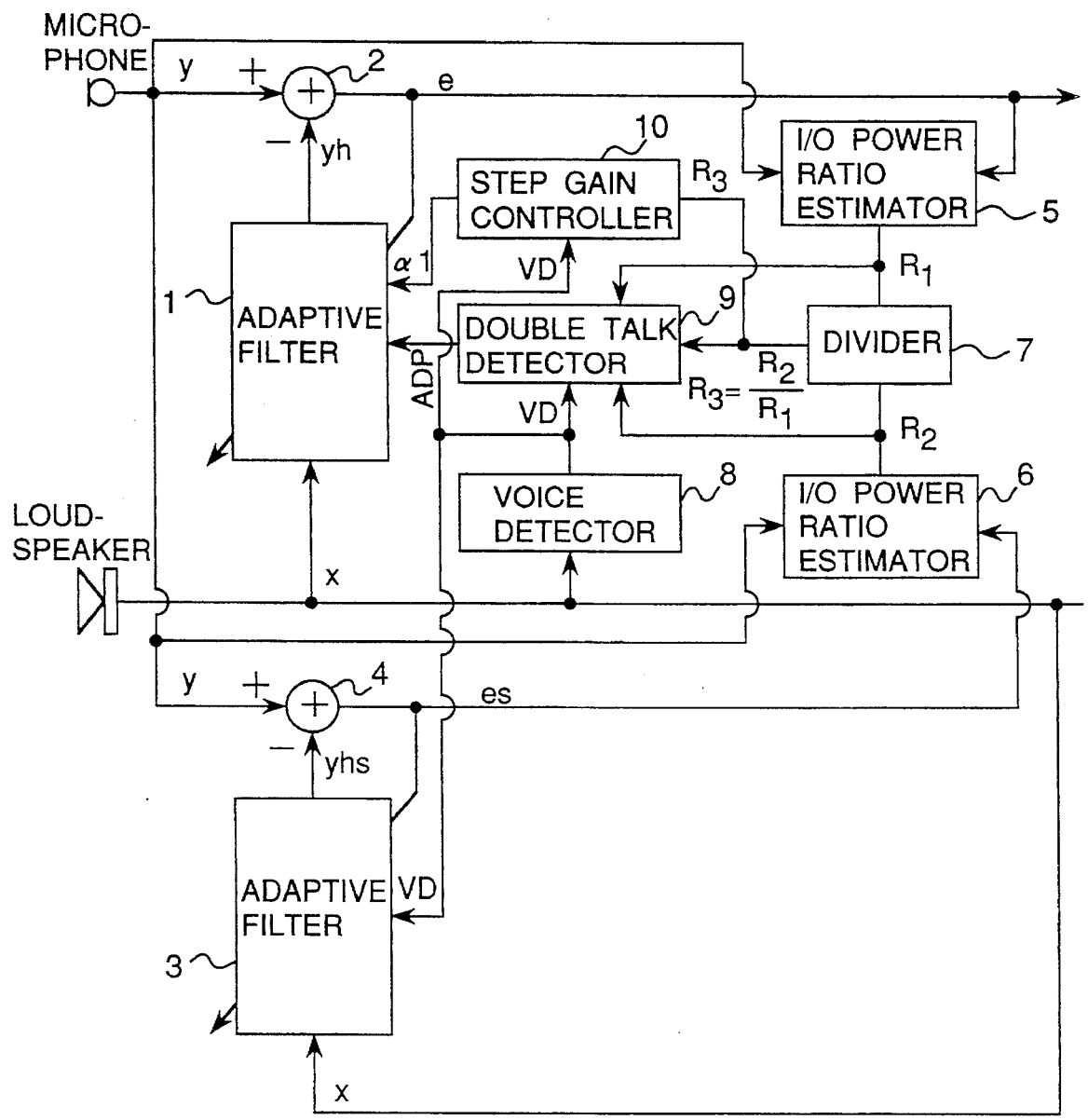
FIG. 8 is a block diagram showing a construction of an echo canceller according to a second embodiment of the present invention.

FIG. 8 shows the construction of an echo canceller according to a second embodiment of the present invention. As in the first embodiment, it is assumed that signal processing is performed all in digital signal form and that the signal is sampled at a frequency of 8 kHz.

Referring to FIG. 8, the echo canceller includes a first adaptive filter 1, a first subtracter 2, a second adaptive filter 3, a second subtracter 4, a first input-output power ratio estimator 5 for calculating an input-output power ratio R1 of the first subtracter 2, and a second input-output power ratio estimator 6 for calculating an input-output power ratio R2 of the second subtracter 4, where the first and second adaptive filters 1 and 3 renew their filter coefficients by NLMS. In FIG. 8, the echo canceller further includes a divider 7 for dividing the second ratio R2 by the first ratio R1, a voice detector 8 for detecting short time power of a received input signal to detect whether far-end speech is present or absent, and a double talk detector 9 for controlling execution and suspension of estimating the impulse response of an echo path of the first adaptive filter 1. The first adaptive filter 1 is identical in the above-described arrangement to that of the first embodiment except that the step gain α1 of the NLMS algorithm is controlled by a step gain controller 10 as described below. In addition, a step gain α2 of the second adaptive filter 3 is fixed at α2=1, the same as in the first embodiment.

The step gain controller 10 controls a step gain α1 of the first adaptive filter 1 by receiving a detection result VD of the voice detector 8 and an output of the divider 7 (a third ratio R3), which the step gain controller 10 performs variable control of the step gain in a range of 1 to ⅛ in proportion to the third ratio R3 when speech has been detected.

Figure 9:
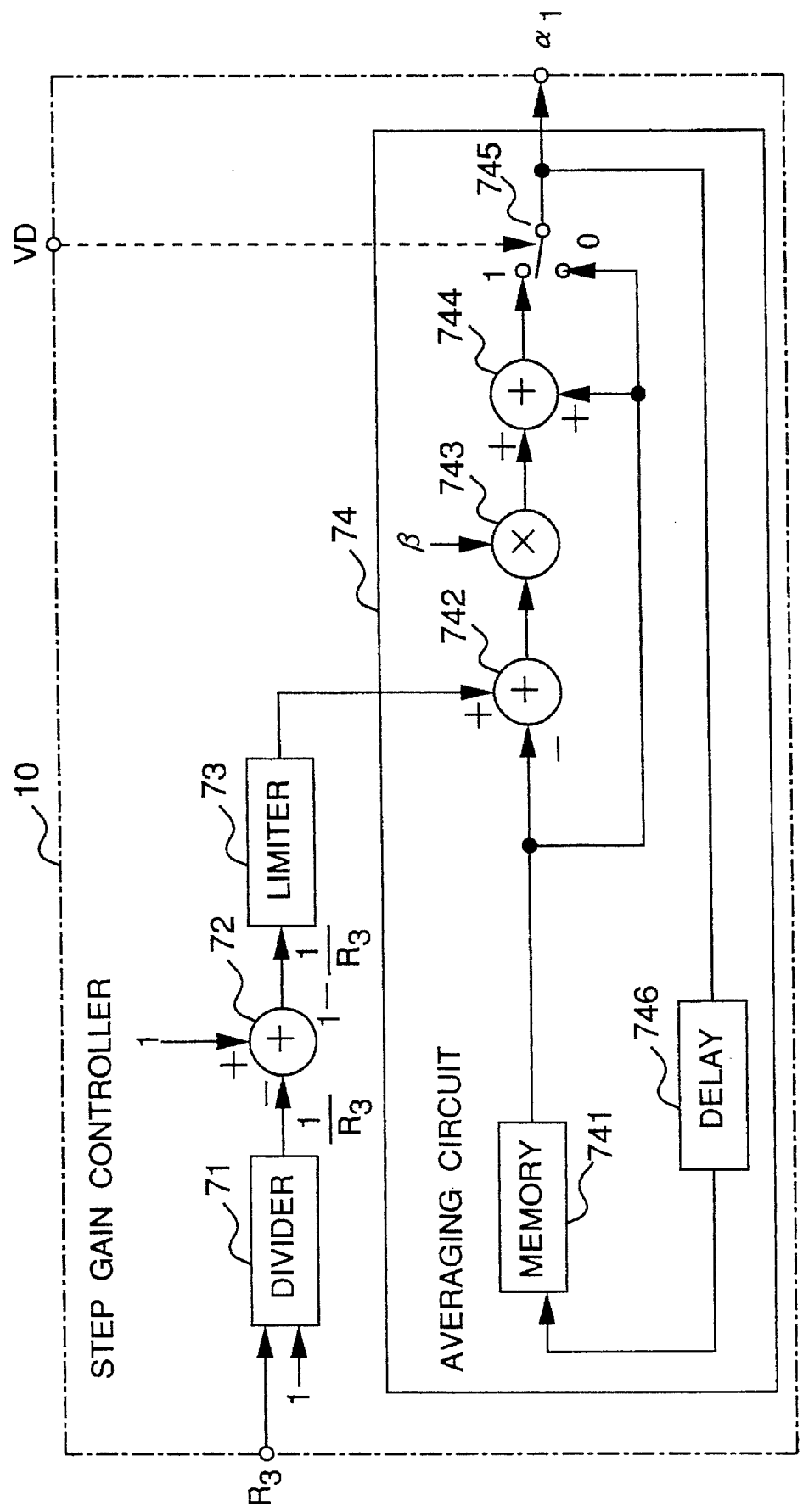
FIG. 9 is a block diagram showing a construction of a step gain controller of the second embodiment.

FIG. 9 shows a detailed construction of the step gain controller 10, which includes a divider 71 for calculating a reciprocal of the third ratio R3, a subtracter 72 for subtracting the reciprocal 1/R3 of the third ratio R3 calculated by the divider 71 from '1', a limiter 73 for limiting the minimum of outputs of the subtracter 72 to ⅛, and an averaging circuit 74 for averaging the outputs of the limiter by a time constant of 50 msec. The averaging circuit 74 further includes a memory 741 for storing the step gain α1, a subtracter 742 for subtracting a value of α1 stored in the memory 741 from the output of the limiter 73, a multiplier 743 for multiplying an output of the subtracter 742 by a constant k (k=0.001), an adder 744 for adding an output of the multiplier 743 to α1. A switch 745 selects an output of the adder 744 when the voice detector 8 has detected that speech is present. Meanwhile, the switch 745 selects the step gain stored in the memory 741 when the voice detector 8 has determined that no speech is present, and in this case the switch 745 yields the step gain α1 as its output. The output of the switch 745 is applied to a delay unit 746 for delaying the output of the switch. The delayed resultant of the delay unit 746 is transferred to the memory 741. The averaging circuit 74 is provided to remove a peak dip in short time of the third ratio R3 so as to obtain a stable step gain. It is arranged by the switch 745 that the step gain α1 will not be renewed when received speech is absent.

Regarding the echo canceller of the second embodiment with the above-described arrangement, its operation is described below with reference to FIGS. 10(a) to 10(d), an explanatory view of the principle of step gain control.

In FIGS. 10(a) to 10(d), the timing charts are shown when the echo path has changed at t1 in a single talk state under the condition that the first and second adaptive filters 1 and 2 have sufficiently converged, where FIG. 10(a) shows the variation of the first and second ratios R1 and R2 with respect to the first threshold Th1 with time lapse, FIG. 10(b) shows the variation of the third ratio R3 with respect to the second threshold Th2, FIG. 10(c) shows the variation of the step gain α1, and FIG. 10(d) shows the variation of a control signal ADP for execution and suspension of adaptation of the first adaptive filter 1.

Upon an abrupt change of the echo path, as described in the first embodiment, there will be an increased difference, in an early stage following the change, between the impulse response of the changed echo path and the impulse response estimated by the first and second adaptive filters 1 and 3. Therefore, the first and second subtracters 2 and 4 could not cancel the echo. Accordingly, the moment the echo path has changed, the first and second ratios R1 and R2 become smaller than the first threshold Th1, while the third ratio R3 also becomes smaller than the second threshold Th2, where the double talk detector 9 suspends adaptation of the first adaptive filter 1 in a period of t1–t2 in FIG. 10(d). If the voice detector 8 has determined that a speech signal is present, adaptation of the second adaptive filter 3 has been executed, so that the difference is decreased between the impulse response estimated by the second adaptive filter 3 and the impulse response of the changed echo path. The second subtracter 4 goes on cancelling the echo, while the second ratio R2 alone gradually increases. Thus, from the time t1 on, the third ratio R3 resulting from dividing the second ratio R2 by the first ratio R1 increases like the second ratio R2 as shown in FIG. 10(b). As the third ratio R3 increases, the output 1/R3 of the divider 71 in the step gain controller 10 decreases, where the output of the subtracter 72 gradually increases toward '1'. The minimum output of the subtracter 72 is limited to ⅛ by the limiter 73, and its fine variations are removed through averaging process by the averaging circuit 74, so that the output of the subtracter 72 comes to increase more stably with time. During the period (t1–t2) in which the third ratio R3 is smaller than the second threshold Th2 and adaptation of the first adaptive filter 1 is kept suspended, the step gain $\alpha 1$ also rapidly increases as the third ratio R3 increases. When the third ratio R3 has exceeded the second threshold Th2 until adaptation of the first adaptive filter 1 comes to be executed at t3, the step gain $\alpha 1$ becomes a large value close to 1, where the first adaptive filter 1 is renewed in its filter coefficient by a fast-converging step gain. In a state that the first adaptive filter 1 has sufficiently adapted, the third ratio R3 becomes approximately 1 or less than 1, where the step gain $\alpha 1$ is set to the minimum ⅛ of the limiter 73 in the step gain controller 10. Thus, a large echo return loss enhancement can be obtained even in an environment with surrounding noises.

Also, in a double talk state, as described in the first embodiment, the third ratio R3 has become less than 1 (a period of t1–t2 as shown in FIG. 7(e)), so that the step gain $\alpha 1$ is set to the minimum so as to allow the echo to be successfully cancelled.

As described above, in the second embodiment, the step gain of the first adaptive filter is controlled in proportion to the third ratio, whereby the converging speed of the first adaptive filter at the time when the echo path has changed can be improved more than in the conventional case where the step gain is fixed to ¼. Further, either in a single talk where convergence has been achieved sufficiently or in a double talk state, the step gain can be maintained small, so that the final echo return loss enhancement can be increased.

Third embodiment

Nextly, a third embodiment of the present invention is described with reference to FIGS. 11 to 13.

Figure 11:
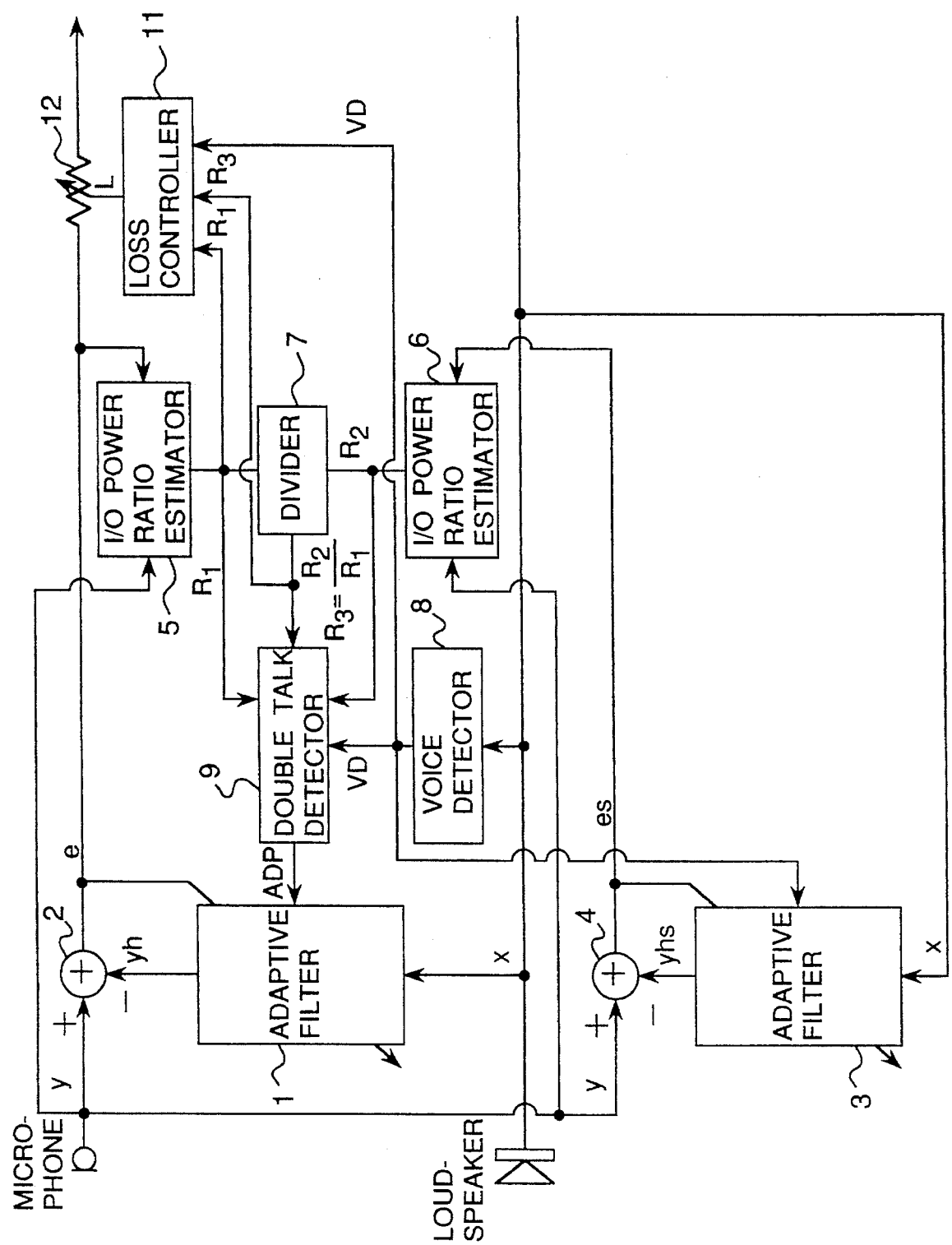
FIG. 11 is a block diagram showing a construction of an echo canceller according to a third embodiment of the present invention.

FIG. 11 shows the construction of an echo canceller according to the third embodiment of the present invention. In the same manner as in the first embodiment, it is assumed that signal processing is performed all in digital signal form and that the signal is sampled at a frequency of 8 kHz.

Referring to FIG. 11, the echo canceller includes a first adaptive filter 1, a first subtracter 2, a second adaptive filter 3, a second subtracter 4, a first input-output power ratio estimator 5 for calculating an input-output power ratio R1 of the first subtracter 2, and a second input-output power ratio estimator 6 for calculating an input-output power ratio R2 of the second subtracter 4, where the first and second adaptive filters renew their filter coefficients by NLMS. In FIG. 11, there are further provided a divider 7 for dividing the second ratio R2 by the first ratio R1, a voice detector 8 for detecting short time power of a received input signal to detect whether far-end speech is present or absent, and a double talk detector 9 for controlling execution and suspension of estimating an impulse response of an echo path of the first adaptive filter 1. The above arrangement is the same as in the first embodiment.

A loss controller 11 estimates a loss L to be inserted into a transmitting output e by using the first ratio R1 estimated by the first input-output power ratio estimator 5, the third ratio R3 calculated by the divider 7, and a determination result VD of the voice detector 8. A loss circuit 12 attenuates an output signal e of the first subtracter 2 by the loss L estimated by the loss controller 11.

Figure 12:
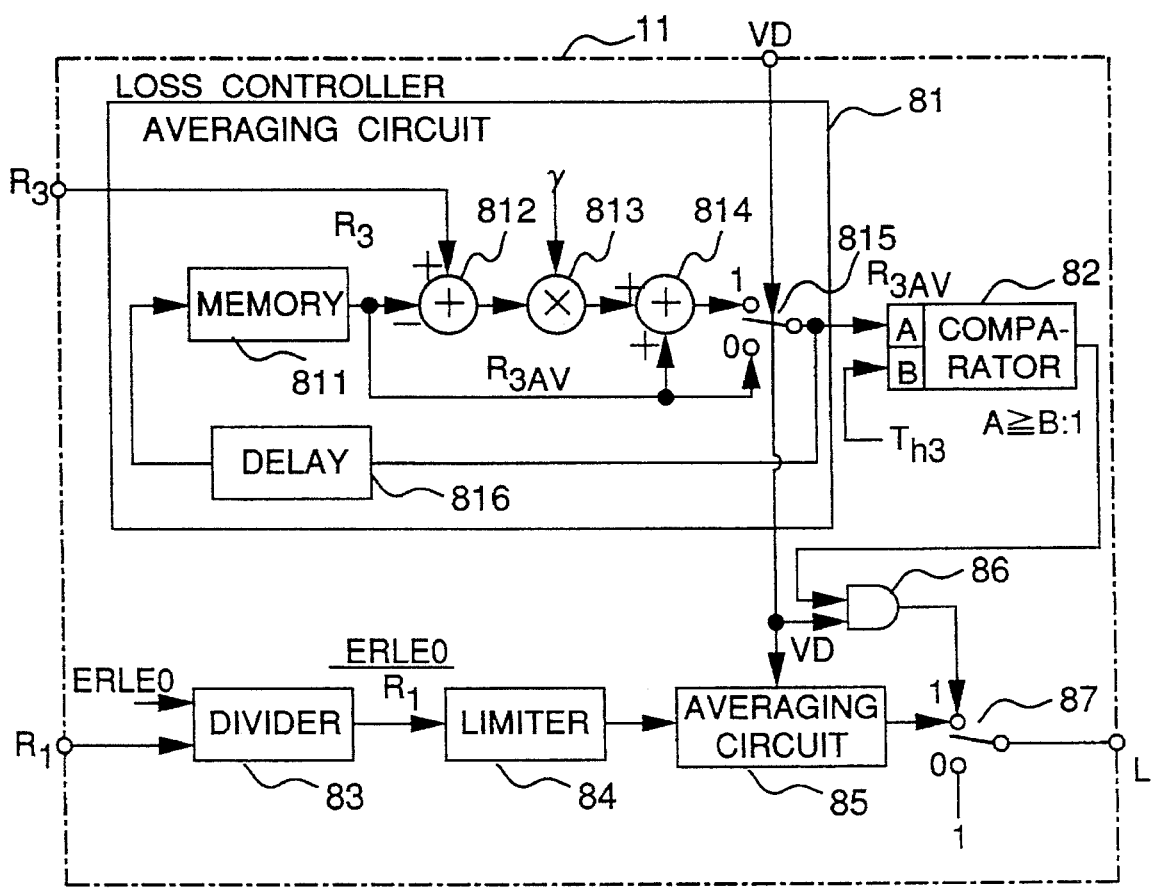
FIG. 12 is a block diagram showing a construction of an insertion loss circuit of the third embodiment.

FIG. 12 shows a detailed construction of the loss controller 11. Referring to FIG. 12, the loss controller 11 includes an averaging circuit 81 for calculating a short-time average value of the third ratio R3, a comparator 82 for comparing a predetermined third threshold Th3 with an output $R3_{AV}$ of the averaging circuit 81, a divider 83 for dividing a predetermined constant ERLEO corresponding to a maximum of the insertion loss by the first ratio R1, a limiter 84 for limiting an output of the divider 83 to 1 when it is less than 1 and to ERLEO when it is greater than ERLEO, an averaging circuit 85, which has the same arrangement as the averaging circuit 81, for calculating a short-time average value of an output of the limiter 84, and an AND circuit 86 for calculating a logic AND between an output of the comparator 82 and an output VD of the voice detector 8. A switch 87 is further provided for selecting between the output of the averaging circuit and the output of the AND circuit 86 in such a manner that, the switch 87 selects the output of the averaging circuit 85 when the output of the AND circuit 86 is a '1', while the switch 87 selects a constant "1" when the output of the AND circuit 86 is a constant '0'. The third threshold Th3 is a predetermined constant smaller than the second threshold Th2 and greater than 1. In this embodiment, it is assumed that Th3=3.

The averaging circuit 81 comprises a memory 811 for storing operation results, a subtracter 812 for subtracting a value stored in the memory 811 from an input R3, a multiplier 813 for calculating a product of an output of the subtracter 812 and a constant $\gamma$, an adder 814 for adding together an output of the multiplier 813 and an output $R3_{AV}$ of the memory 811, and a switch 815 for selecting between an output of the adder 814 and an output of the memory 811. The switch 815 selects the output of the adder 814 when the voice detector 8 has detected speech and otherwise selects the output of the memory 811. Thus, the averaging circuit 81 calculates the average value of the input only when the voice detector 8 has detected far-end speech and otherwise holds the previous value. In the averaging circuit 81, the constant $\gamma$ is set at 0.0025 so that the averaging time constant becomes 50 msec for the sampling at 8 kHz.

The echo canceller with the above-described arrangement is described below with reference to FIGS. 13(a) to 13(d), explaining a principle thereof. FIGS. 13(a) to 13(d) each shows the variation state of the insertion loss when the echo path is changed at a time t1 under the condition that the first and second adaptive filters have sufficiently converged. As in the first and second embodiments, upon an echo path change, the third ratio R3 gradually increases immediately after the echo path change (FIG. 13 (b)). The loss controller 11 calculates a value $R3_{AV}$ resulting from the averaging circuit 81 averaging the third ratio R3 with a time constant of 50 msec. The comparator 82 compares $R3_{AV}$ with the third threshold Th3, where in a short time after the echo path has changed, the value R3AV becomes greater than the third threshold Th3 at a time t2 as shown in FIG. 13(b).

Also, the divider 83 divides the constant ERLEO by the first ratio R1 and the resultant value is limited by the limiter 84. The averaging circuit 85 averages the output of the limiter 84 by the time constant of 50 msec. At the time t2, since the AND circuit 86 outputs a logic "1", the switch 87 selects the output of the averaging circuit 85 while the first ratio R1 has not yet started to increase after the echo path has changed, where for example when R1=1, the output of the averaging circuit 85 is ERLEO, resulting in a large insertion loss L to be yielded as an output of the loss controller 11.

After the double talk detector 9 has controlled to execute adaptation of the first adaptive filter 1 at time t3, the first ratio R1 gradually increases while the output of the divider 83 in the loss controller 11 also gradually decreases. As a result, the loss L also decreases gradually. That is, when the voice detector 8 has detected far-end speech and besides the short-time average $R3_{AV}$ of the third ratio R3 is greater than the third threshold Th3, then the insertion loss L changes in inverse proportion to the first ratio R1 as shown in FIG. 13(c). The loss circuit 12 attenuates the output e of the first subtracter 2 according to the loss L calculated by the loss controller 11, thereby attenuating the echo that has not been cancelled by the first subtracter 2 as a result of the echo path change, so that the echo is suppressed.

Otherwise, when no far-end speech has been detected by the voice detector 8, the loss L is controlled to be 1 by the switch 87 so that a loss will not be inserted to the transmitting output. That is, if the far-end speaker is vocalizing and the third ratio R3 is greater than the third threshold Th3 (i.e., in the period from t2 to t4), then the loss L is inserted into the transmission side. Since it is when the echo path has changed in a single talk state that the third ratio R3 becomes greater than the third threshold Th3, insertion of the loss will almost never cause near-end speech to be attenuated.

As described above, in the third embodiment, the voice detector 8 detects far-end speech, and only when the short time average of the third ratio R3 is greater than the third threshold Th3, a loss in inverse proportion to the short time average of the first ratio R1 is inserted into the output of the subtracter 2. This allows the echo that has not been cancelled by the first subtracter 2 as a result of an echo path change to be attenuated by the loss circuit 12 and thus suppressed.

Fourth embodiment

Next, a fourth embodiment of the present invention is described with reference to FIGS. 14 to 16.

Figure 14:
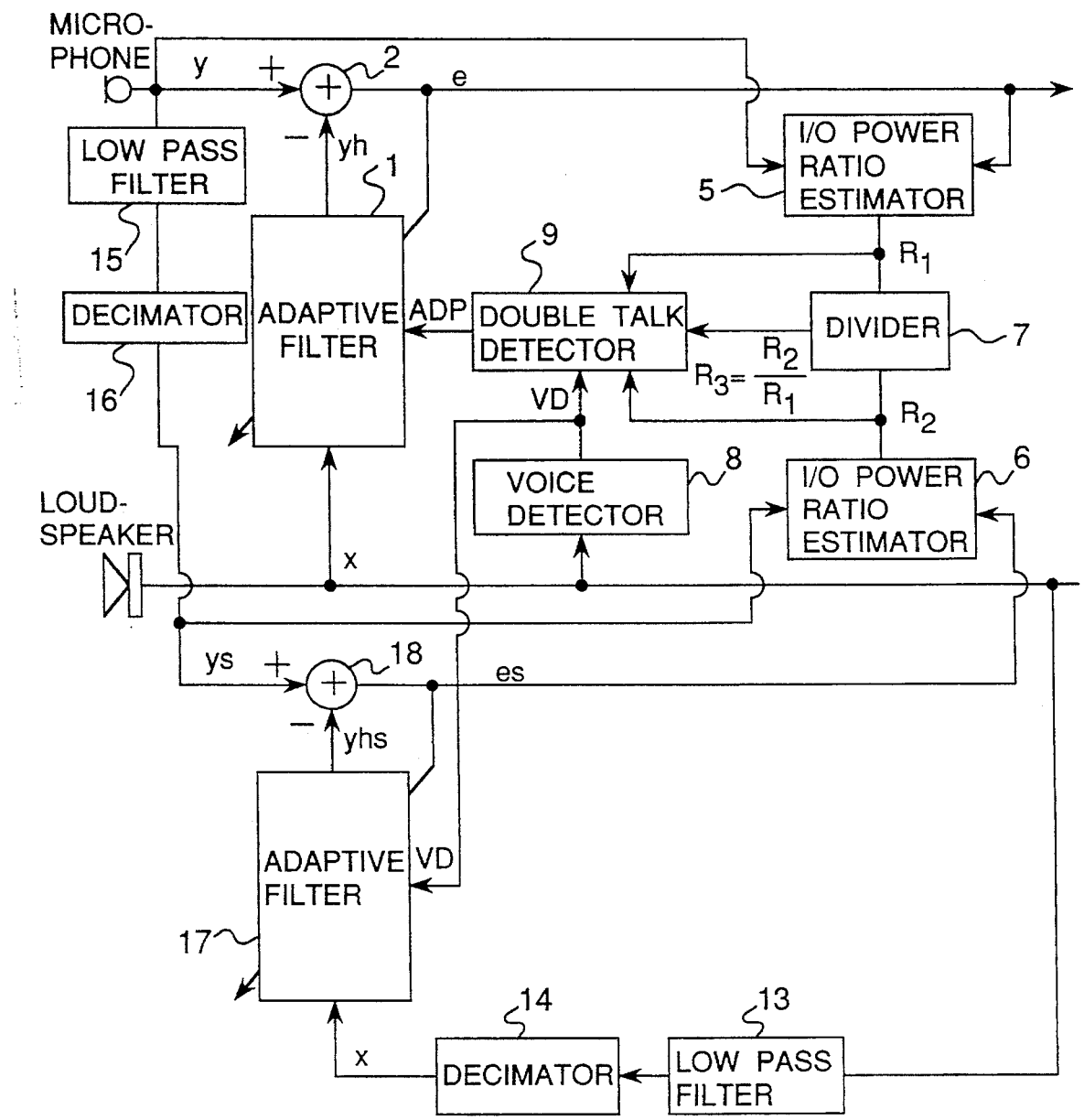
FIG. 14 is a block diagram showing a construction of an echo canceller according to a fourth embodiment of the present invention.
Figure 15:
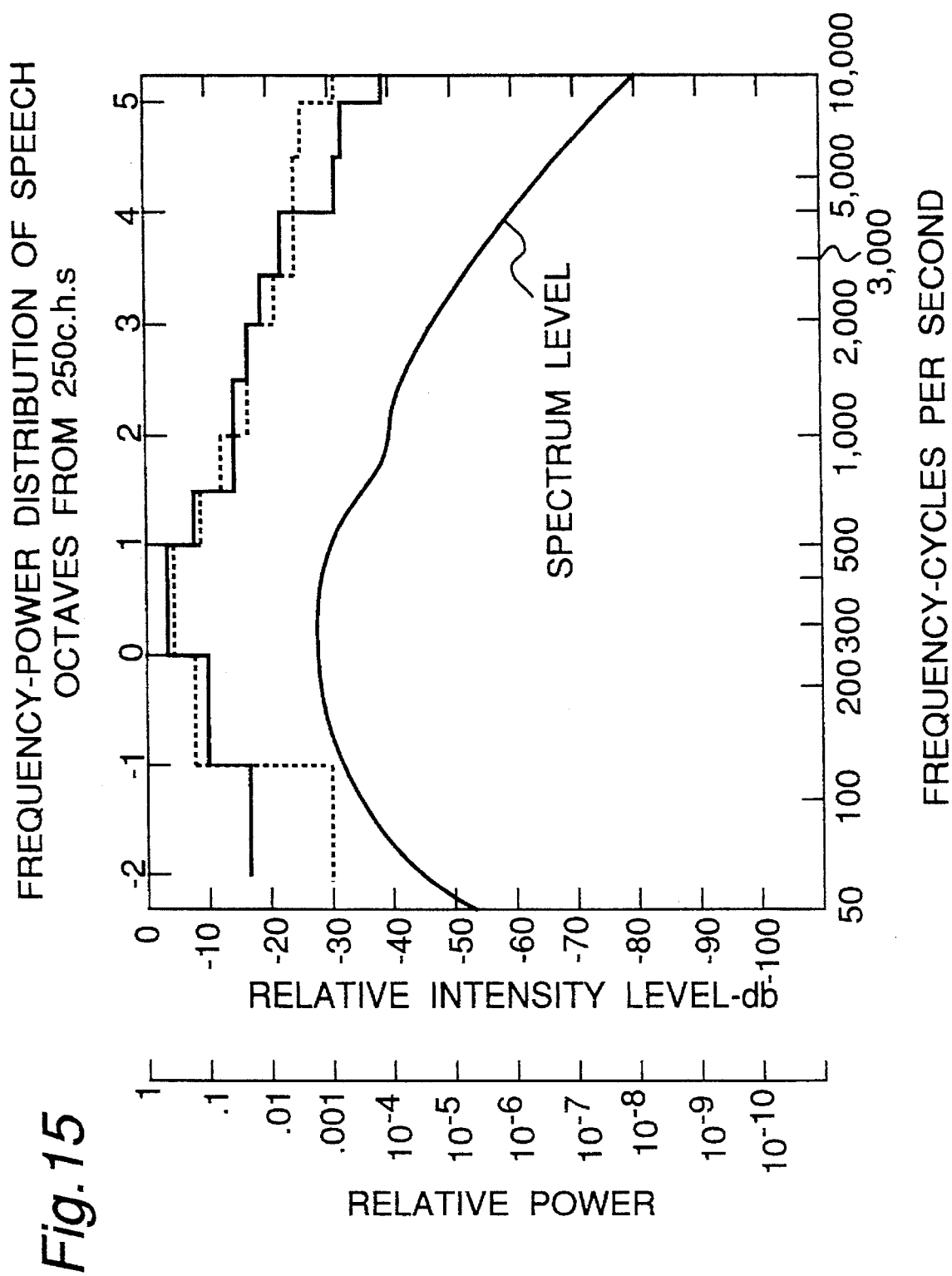
FIG. 15 is a chart showing an example of long-time spectrum of speech.

FIG. 14 shows the construction of an echo canceller according to the fourth embodiment of the present invention. As in the first embodiment, it is assumed that signal processing is performed all in digital signal form and that the signal is sampled at a frequency of 8 kHz.

Referring to FIG. 14, the echo canceller includes a first adaptive filter 1, a first subtracter 2, a first input-output power ratio estimator 5 for calculating an input-output power ratio R1 of the first subtracter 2, and a second input-output power ratio estimator 6 for calculating an input-output power ratio R2 of the second subtracter 4. In FIG. 14, a divider 7 is further provided for dividing the second ratio R2 by the first ratio R1 to calculate a third ratio R3. A voice detector 8 detects short time power of a received input signal to detect whether far-end speech is present or absent, and a double talk detector 9 controls execution and suspension of estimating an impulse response with respect to an echo path of the first adaptive filter 1. The above arrangement is the same as in the first embodiment.

A low-pass filter 13 extracts low-band components of a received input signal x, the pass band of the low-pass filter 13 being assumed to be below 900 Hz in this embodiment. A decimator 14 decimates an output of the low-pass filter 13 according to the pass band of the low-pass filter. Another low-pass filter 15, which has the same construction as the low-pass filter 13, extracts low-band components of a transmitting input signal y. A decimator 16, which has the same as the decimator 14, decimates an output of the low-pass filter 15. The echo canceller further includes a second adaptive filter 17 and a second subtracter 18. Whereas an input signal of the first adaptive filter 1 is sampled at a frequency of 8 kHz, the second adaptive filter 17 and the second subtracter 18 allow the sampling frequency to be lowered to 2 kHz by limiting the pass band to below 900 Hz, thus capable of a ¼ decimation.

The first and second adaptive filters 1 and 17 renew their filter coefficients by NLMS. By decimating an input of the second adaptive filter 17 to ¼, the taps of the second adaptive filter 17 becomes ¼ in number of the first adaptive filter 1. This is because, since the sampling frequency of the second adaptive filter 17 is ¼ that of the first adaptive filter 1, the same echo cancelling time can be realized by a ¼ number of taps of the first adaptive filter 1.

From the above fact, since the quantity of operation per unit time is in proportion to the product of sampling frequency x number of filter taps, the quantity of operation per unit time required for the second adaptive filter 17 results in approximately ¼×¼=1/16 that of the first adaptive filter 1. The second adaptive filter 17 renews its filter coefficient once for every sampling frequency that has been decimated to 1/M according to an NLMS (Normalized Least Mean Square) algorithm. A step gain α2, as in the first embodiment, is set to '1' where the converging speed is the fastest in the NLMS algorithm.

Thus, by limiting the pass band of the second adaptive filter 17 and the second subtracter 18 and decimating their input to 1/M, the quantity of operation of the second adaptive filter can be reduced to $1/M^2$, so that the quantity of operation enough to realize the second adaptive filter can be reduced substantially.

Also, the low-pass filters 13 and 15 having their pass bands of 900 Hz are provided at the preceding stages of the decimators 14 and 16. This is because, as shown in FIG. 15 representing a long-time spectrum of speech, due to the fact that most of the energy of speech is concentrated on the band below 1 kHz, and that voiced sound consists of waves of high frequencies of integral multiplication of fundamental waves, and that a double talk and any echo path change can be discriminated from each other only by cancelling echoes of speech below 900 Hz. For the above reasons, the fourth embodiment operates on the same principle as in the first embodiment shown in FIG. 7, the description of its operation being omitted here.

It is applicable also to the second and third embodiments that decimation is performed by the decimator by limiting the pass band of the second adaptive filter and the second subtracter with use of the low-pass filters, as in the fourth embodiment. In such applications, as in the fourth embodiment, the quantity of operation per unit time required for the second adaptive filter can be reduced.

Figure 16:
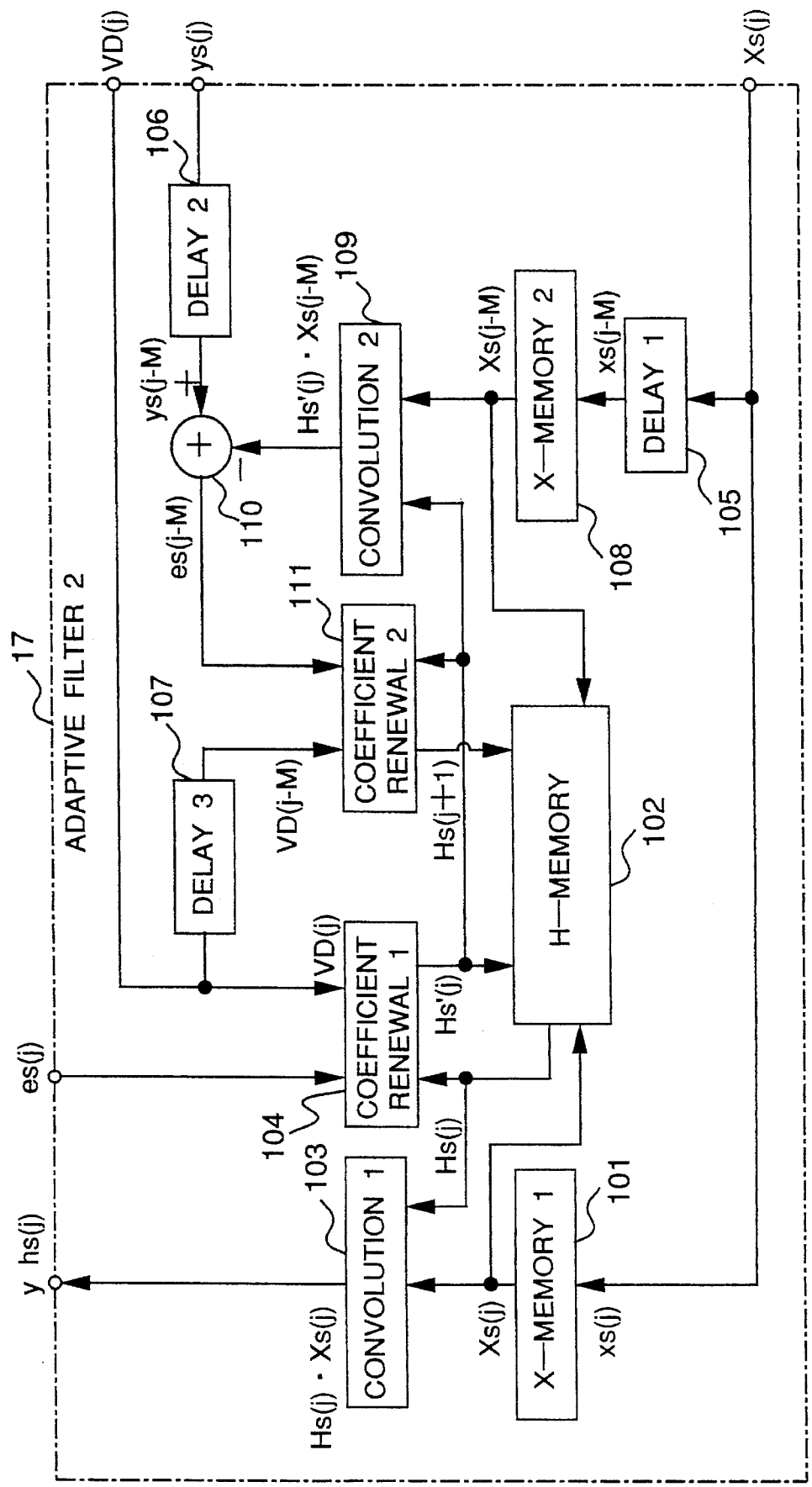
FIG. 16 is a block diagram showing a construction of the second adaptive filter which executes renewal of the filter coefficient two times within a sample.
Figure 17:
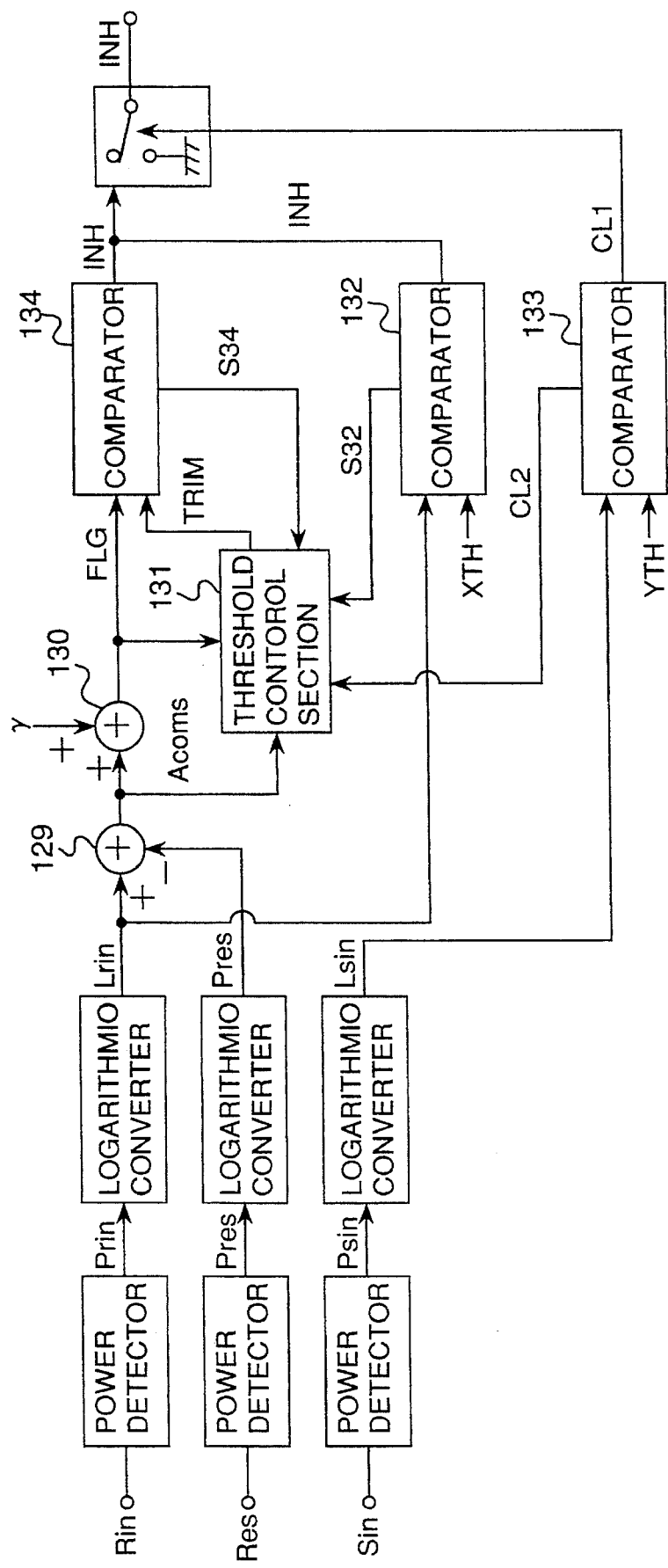
FIG. 17 is block diagram of a conventional double talk detector.

FIG. 16 shows the construction of the second adaptive filter 17 in FIG. 14 with its converging speed improved.

Referring to FIG. 16, the second adaptive filter 17 includes a first X-memory 101 for storing a received input signal corresponding to N samples, an H-memory 102 for storing filter coefficients corresponding to N samples, a first convoluter 103 for convoluting the latest data corresponding to N samples stored in the first X-memory 101 with the data stored in the H-memory 102 to synthesize a pseud echo, and a first coefficient renewer 104 for renewing N filter coefficients stored in the H-memory according to the NLMS (Normalized Least Mean Square) algorithm by using an output signal e of the first subtracter and the latest data corresponding to N samples stored in the first X-memory when the voice detector has determined that speech is present. A first delay 105 is provided for delaying the received input signal by M samples, and a second delay 106 is provided for delaying a transmitting input signal by M samples, and a third delay 107 is provided for delaying a detection result of the voice detector by M samples. A second X-memory 108 is provided for storing an output of the first delay 105 corresponding to N samples. A second convoluter 109 convolutes data corresponding to N samples stored in the second X-memory with the data stored in the H-memory to synthesize a pseud echo. A subtracter 110 subtracts an output of the second convoluter 109 from an output of the second delay 106. A second coefficient renewer 111 renews N filter coefficients stored in the H-memory 102 according to the NLMS algorithm with use of an output signal e2 of the second subtracter and data corresponding to N samples stored in the second X-memory 108. In this embodiment, the second adaptive filter 17 processes data sampled at a sampling frequency of 2 kHz, with use of constants N and M being both 500, and delay time being 250 msec.

The second adaptive filter 17 constructed as mentioned above is described below on its operation. A reference input signal x(j) (where j is sample number) is stored in the first X-memory 101 as the latest data of the first X-memory 101. The first X-memory 101 has the last 500-number of data series X(j) stored therein. Convolution of the first X-memory 101 and the H-memory 102 having filter coefficients stored therein is performed by the first convoluter 103. In the coefficient renewer 104, an N-in-number filter coefficient series of the H-memory, Hs (j)={hs$_0$(j), hs$_1$(j), . . ., hs$_{N-1}$(j)} is renewed according to the NLMS algorithm as shown in formula (8) by using both a signal es(j) resulting from subtracting the output of the first convoluter 103 from the transmitting input by the second subtracter 18 of FIG. 14 and data series Xs(j)={xs$_0$(j), xs$_1$(j), . . . , xs$_{N-1}$(j)):

$$hs'_i(j) = hs_i(j) + es(j) \cdot xs_i(j) / \sum_{i=0}^{N-1} xs_i(j)^2 \qquad (8)$$

Next, a reference input signal x(j−M) delayed by M samples by the first delay 105 is stored in the second X-memory 108, which has stored the last 500-in-number of data series X(j−M) out of the x(j−M). Convolution of filter coefficient series Hs' (j) renewed by the second X-memory 108 and the first filter coefficient renewer 104 is performed by the second convoluter 109. A transmitting input signal ys(j) is delayed by M samples by the second delay 106 and entered into the subtracter 110. The subtracter 110 subtracts an output of the second convoluter 109 from the output ys (j−M) of the second delay 106. Then, in the second coefficient renewer 111, a renewed N-in-number filter coefficient series of the Hs memory, Hs' (j)={hs'$_0$(j), hs'$_1$(j) , . . . , hs'$_{N-1}$(j)} is renewed according to the NLMS algorithm shown by formula (9) by using an output es' (j) of the subtracter and a data series of the second X-memory 108, Xs (j−M)={xs$_0$(j−M), xs$_1$(j−M), . . . , xs$_{N-1}$(j−M)} which is used in the next sample: whereby a filter coefficient series Hs(j)= {hs$_0$(j+1) , $$hs_1(j+1) = hs'_i(j) + es'(j) \cdot xs_i(j-M) / \sum_{i=0}^{N-1} xs_i(j-M)^2 \qquad (9)$$

hs$_1$(j+1), . . . , hs$_{N-1}$(j+1)} is created.

The second adaptive filter 17 as shown in FIG. 16 can be improved in converging speed up to two times that of ordinary adaptive filters by renewing the filter coefficient two times within one sample. Improved converging speed of the second adaptive filter allows the second adaptive filter to be converged faster, so that the second ratio that is an output of the second input-output power ratio estimator increases faster. Therefore, when the echo path has changed, the double talk detector 9 continues to suspend adaptation of the first adaptive filter 1 for a shorter period, so that the tracking performance to echo path change is further improved.

Also, in the second embodiment, by improving the increasing speed of the second ratio on an echo path change, the step gain of the first adaptive filter is set to a value close to 1 and as large as possible when the echo path has changed. Thus, the converging speed of the first adaptive filter can be improved.

In the third embodiment, upon an echo path change, a loss can be inserted at a faster timing, which allows the suppression of the echo to be achieved earlier.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An echo canceller which comprises:

a first adaptive filter for estimating an impulse response of an echo path between reception and transmission sides, holding the estimated impulse response as a first filter coefficient, and convoluting the first filter coefficient with a received input signal to thereby synthesize a first pseud echo;

a first subtracter for subtracting the first pseud echo synthesized by said first adaptive filter from a transmitting input signal to thereby cancel an echo contained in the transmitting input signal;

a second adaptive filter for estimating an impulse response of the echo path, holding the estimated impulse response as a second filter coefficient, and convoluting the received input signal with the second filter coefficient to thereby synthesize a second pseud echo;

a second subtracter for subtracting the second pseud echo synthesized by said second adaptive filter from the transmitting input signal to thereby cancel the echo;

a first input-output power ratio estimator which detects short time powers of input and output signals of said first subtracter to calculate a first I/O power ratio of an input-short-time-power/output-short-time-power of said first subtracter;

a second input-output power ratio estimator which detects short time powers of input and output signals of said second subtracter to calculate a second I/O power ratio of an input-shot-time-power/output-short-time-power of said second subtracter;

a divider for dividing the second I/O power ratio by the first I/O power ratio to calculate a third ratio;

a voice detector for detecting a short time power of the received input signal to determine whether far-end speech is present or absent, wherein said voice detector controls said second adaptive filter to execute adaptation of said second adaptive filter for renewal of an impulse response of an echo path when far-end speech is present and otherwise to suspend the adaptation of said second adaptive filter when far-end speech is absent; and a double talk detector for controlling said first adaptive filter to execute or suspend adaptation of said first adaptive filter according to the determination results of said voice detector.

2. The echo canceller as claimed in claim 1, wherein said double talk detector controls said first adaptive filter to suspend adaptation of said first adaptive filter for renewal of an impulse response of an echo path when said voice detector determines that far-end speech is absent, and otherwise to execute the adaptation of said first adaptive filter when said voice detector determines that far-end speech is present under at least one of the following conditions (a) and (b) is satisfied:

(a) either the first or the second I/O power ratio is greater than a first threshold; and (b) the third ratio is greater than a fixed second threshold.

3. The echo canceller as claimed in claim 1, wherein said double talk detector comprises:

a threshold controller for controlling the first threshold to be produced therefrom, which receives the first I/O power ratio generated by said first I/O power ratio estimator to thereby control the first threshold to be produced according to an output result of said voice detector in such a manner that, the first threshold is gradually increased so as not to exceed the first ratio when far-end speech is present and besides the first ratio is greater than the first threshold, while the first threshold is gradually decreased when the first ratio is smaller than the current threshold irrespective of the presence of far-end speech, and otherwise the previous value of the first threshold is held when no speech is present; and an adaptation controller for controlling an adaptation of said first adaptive filter in such a manner that said adaptation controller determines to execute the adaptation of said first adaptive filter in either case when far-end speech is present and besides at least one of the first and second ratios is greater than the first threshold or in a case when the third ratio is greater than the second threshold.

4. The echo canceller according to claim 3, wherein said threshold controller comprises: a memory for storing the first threshold; a comparator for comparing the first I/O power ratio with the first threshold; a switch which selects a constant when the comparator has determined that the first I/O power ratio is greater than the first threshold and otherwise which selects a constant; a subtracter which subtracts the first threshold from the first I/O power ratio; a multiplier which calculates a product of a time constant selected by the switch and an output of the subtracter; an adder for adding together an output of the multiplier and the first threshold; a limiter for limiting the maximum and minimum of an output of the adder; a switch which selects an output of the limiter when far-end speech is present, and which selects an output of the memory when no speech is present, in accordance with the output signal of said voice detector; a delay unit for delaying an output of the switch by one sample and the resultant output thereof is transferred to the memory.

5. The echo canceller according to claim 3, wherein said adaptation controller comprises:

a first comparator for comparing the first threshold created by the threshold controller with the first I/O power ratio calculated by the first input-output power ratio estimator to yield a positive output when the first ratio is greater that the other and otherwise to yield a negative output;

a second comparator for comparing the second ratio calculated by the second input-output power ratio estimator with the first threshold to yield a positive output when the second ratio is greater than the other and otherwise to yield a negative output;

a third comparator for comparing the third ratio calculated by the divider with the second fixed threshold to yield a positive output when the third ratio is greater than the other and otherwise to yield a negative output;

an OR circuit for determining a logical OR of the three comparators; and an AND circuit for determining a logical AND between a determination result of the voice detector and a logic output of the OR circuit.

6. The echo canceller as claimed in claim 1, wherein the renewal of the first and second filter coefficients of said first and second adaptive filters is performed according to an Normalized Least Mean Square algorithm, and a step gain of the first adaptive filter is smaller than a step gain of the second adaptive filter, where the step gain of the second adaptive filter is 1.

7. The echo canceller as claimed in claim 1, wherein a reference input signal of said second adaptive filter and an input signal of said second subtracter are band-limited to 1/M, where M is an integer not less than 2, of a pass band of said first adaptive filter by band-limiting filter means and the resultant band-limited signals are further decimated to 1/M by decimator means.

8. The echo canceller as claimed in claim 7, wherein said band-limiting filter means is a low-pass filter whose cut-off frequency is lower than 1 kHz.

9. The echo canceller as claimed in claim 7, wherein said second adaptive filter comprises:

a first X-memory for storing a received input signal corresponding to N samples where N is an integer;

an H-memory for storing filter coefficients corresponding to N samples;

a first convoluter for convoluting the latest data corresponding to N samples stored in the first X-memory with data stored in the H-memory to thereby synthesize a pseud echo;

a first coefficient renewer for renewing the filter coefficients stored in the H-memory by using an output signal of the first subtracter and the data stored in the first X-memory when the voice detector has determined that far-end speech is present;

a first delay for delaying the received input signal by M samples;

a second delay for delaying the transmitting input signal by M samples;

a third delay for delaying a detection result of said voice detector by M samples;

a second X-memory for storing an output of the first delay corresponding to N samples;

a second convoluter for convoluting the data corresponding to N samples stored in the second X-memory with the data stored in the H-memory to synthesize a pseud echo;

a third subtracter for subtracting an output of the second convoluter from an output of the second delay; and a second coefficient renewer for renewing the filter coefficients stored in the H-memory by using an output signal and step gain of the third subtracter and the data stored in the second X-memory when a detection result of the voice detector corresponding to the last M samples delayed by the third delay is determined that far-end speech is present.

10. The echo canceller as claimed in claim 1 further comprising a step gain controller for controlling a step gain to be applied to said first adaptive filter according to both the determination result of said voice detector and the third ratio.

11. The echo canceller as claimed in claim 10, wherein said step gain controller further comprises: a divider for calculating a reciprocal of the third ratio; a subtracter for subtracting an output of said divider from 1; a limiter for limiting an output of said subtracter within a specified range; and an averaging circuit for averaging an output of said limiter by a specified time constant when said voice detector has detected speech, and otherwise for yielding a value of a previous step gain when said voice detector has detected no speech.

12. The echo canceller as claimed in claim 10, wherein renewal of the first and second filter coefficients of said first and second adaptive filters is performed according to an Normalized Least Mean Square algorithm where the step gain of said second filter is 1.

13. The echo canceller as claimed in claim 10, wherein a reference input signal of said second adaptive filter and an input signal of said second subtracter are band-limited to 1/M, where M is an integer not less than 2, of a pass band of said first adaptive filter by band-limiting filter means and the resultant band-limited signals are further decimated to 1/M by decimator means.

14. The echo canceller as claimed in claim 13, wherein said band-limiting filter means is a low-pass filter whose cut-off frequency is lower than 1 kHz.

15. The echo canceller as claimed in claim 13, wherein said second adaptive filter comprises:

a first X-memory for storing a received input signal corresponding to N samples where N is an integer;

an H-memory for storing filter coefficients corresponding to N samples;

a first convoluter for convoluting the latest data corresponding to N samples stored in the first X-memory with data stored in the H-memory to thereby synthesize a pseud echo;

a first coefficient renewer for renewing the filter coefficients stored in the H-memory by using an output signal of the first subtracter and the data stored in the first X-memory when the voice detector has determined that far-end speech is present;

a first delay for delaying the received input signal by M samples;

a second delay for delaying the transmitting input signal by M samples;

a third delay for delaying a detection result of said voice detector by M samples;

a second X-memory for storing an output of the first delay corresponding to N samples;

a second convoluter for convoluting the data corresponding to N samples stored in the second X-memory with the data stored in the H-memory to synthesize a pseud echo;

a third subtracter for subtracting an output of the second convoluter from an output of the second delay; and a second coefficient renewer for renewing the filter coefficients stored in the H-memory by using an output signal and step gain of the third subtracter and the data stored in the second X-memory when a detection result of the voice detector corresponding to the last M samples delayed by the third delay is determined that far-end speech is present.

16. The echo canceller as claimed in claim 1 further comprising a loss controller for calculating a loss to be added to the transmitting output signal according to a determination result of the voice detector, the first ratio, and a third ratio; and an insertion loss circuit for attenuating an output signal of said first subtracter by the loss calculated by said loss controller.

17. The echo canceller as claimed in claim 16, wherein said loss controller further comprises:

a first averaging circuit for averaging the third ratio by a specified time constant to be yielded therefrom when the voice detector has detected speech, and otherwise holding a previous operation result to be yielded when no speech has been detected;

a comparator for comparing an output of the first averaging circuit with a predetermined third threshold, thereby to yield a positive output when the output of the first averaging circuit is greater than the third threshold and otherwise to yield a negative output;

an AND circuit for determining a logical AND between an output of said comparator and an output of the voice detector;

a divider for dividing a predetermined maximum loss by the first ratio;

a second averaging circuit for averaging an output of said divider by a specified time constant when the voice detector has detected speech, and otherwise holding a previous operation result thereof when no speech has been detected; and a switch for selecting an output of said second averaging circuit as a loss when the AND circuit has yielded a positive output and otherwise selecting a numerical value 1.

18. The echo canceller as claimed in claim 16, wherein a reference input signal of said second adaptive filter and an input signal of said second subtracter are band-limited to 1/M, where M is an integer not less than 2, of a pass band of said first adaptive filter by band-limiting filter means and the resultant band-limited signals are further decimated to 1/M by decimator means.

19. The echo canceller as claimed in claim 18, wherein said band-limiting filter means is a low-pass filter whose cut-off frequency is lower than 1 kHz.

20. The echo canceller as claimed in claim 18, wherein said second adaptive filter comprises:

a first X-memory for storing a received input signal corresponding to N samples where N is an integer;

an H-memory for storing filter coefficients corresponding to N samples;

a first convoluter for convoluting the latest data corresponding to N samples stored in the first X-memory with data stored in the H-memory to thereby synthesize a pseud echo;

a first coefficient renewer for renewing the filter coefficients stored in the H-memory by using an output signal of the first subtracter and the data stored in the first X-memory when the voice detector has determined that far-end speech is present;

a first delay for delaying the received input signal by M samples;

a second delay for delaying the transmitting input signal by M samples;

a third delay for delaying a detection result of said voice detector by M samples;

a second X-memory for storing an output of the first delay corresponding to N samples;

a second convoluter for convoluting the data corresponding to N samples stored in the second X-memory (108) with the data stored in the H-memory to synthesize a pseud echo;

a third subtracter for subtracting an output of the second convoluter from an output of the second delay; and a second coefficient renewer for renewing the filter coefficients stored in the H-memory by using an output signal and step gain of the third subtracter and the data stored in the second X-memory when a detection result of the voice detector corresponding to the last M samples delayed by the third delay is determined that far-end speech is present.

* * * * *